(12) United States Patent
Kamakura

(10) Patent No.: US 11,340,464 B2
(45) Date of Patent: May 24, 2022

(54) HEAD-MOUNTED DISPLAY APPARATUS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/583,360

(22) Filed: Sep. 26, 2019

(65) Prior Publication Data

US 2020/0103661 A1 Apr. 2, 2020

(30) Foreign Application Priority Data

Sep. 27, 2018 (JP) .............................. JP2018-182321

(51) Int. Cl.
*G02B 27/01* (2006.01)
*G02C 5/00* (2006.01)

(52) U.S. Cl.
CPC ..... *G02B 27/0176* (2013.01); *G02B 27/0172* (2013.01); *G02B 27/0179* (2013.01); *G02C 5/001* (2013.01); *G02B 2027/0178* (2013.01); *G02B 2027/0187* (2013.01)

(58) Field of Classification Search
CPC .... G02B 2027/0178; G02B 2027/0187; G02B 27/0172; G02B 27/0176; G02B 27/0179; G02C 11/10; G02C 2200/22; G02C 5/001; G02C 5/146
USPC .......................................................... 345/8
See application file for complete search history.

(56) References Cited

U.S. PATENT DOCUMENTS

| | | | |
|---|---|---|---|
| 7,313,246 B2 * | 12/2007 | Miller | H04B 1/385 351/123 |
| 2014/0204062 A1 * | 7/2014 | Goto | G02B 27/017 345/184 |
| 2015/0260995 A1 * | 9/2015 | Mukawa | G02B 27/0172 345/8 |
| 2016/0004084 A1 * | 1/2016 | Ishikawa | G02B 25/02 345/8 |
| 2017/0090200 A1 * | 3/2017 | Motoe | G02B 27/0176 |
| 2017/0227779 A1 * | 8/2017 | Kato | H04N 5/64 |

FOREIGN PATENT DOCUMENTS

| | | |
|---|---|---|
| JP | 2012-054713 A | 3/2012 |
| JP | 2016-180939 A | 10/2016 |

* cited by examiner

*Primary Examiner* — Kwin Xie
(74) *Attorney, Agent, or Firm* — Oliff PLC

(57) ABSTRACT

Provided is a head-mounted display apparatus including a frame extending in a first direction, a display unit configured to emit image light in a second direction intersecting the first direction, a casing attached to one end, in the first direction, of the frame and housing a part of the display unit, and a temple portion arranged on a center side of the head-mounted display device, in the first direction, with respect to the casing. The casing includes a side surface positioned on a side on which the temple portion is arranged, and a first recessed portion, in the side surface, opening in the second direction to form a first gap with the temple portion that is arranged along the side surface.

10 Claims, 17 Drawing Sheets

HEAD-MOUNTED DISPLAY APPARATUS

The present application is based on, and claims priority from JP Application Serial Number 2018-182321, filed Sep. 27, 2018, the disclosure of which is hereby incorporated by reference herein in its entirety.

BACKGROUND

1. Technical Field

The present disclosure relates to a head-mounted display apparatus.

2. Related Art

A head-mounted display apparatus mounted on a head of a user and configured to display an image visually recognizable by the user has hitherto been known. As such a head-mounted display apparatus, a head-mounted display with a pair of temple portions suspended on the right and left ears of a user is known (see, for example, JP-A-2016-180939).

A head-mounted display described in JP-A-2016-180939 includes a first display device, a second display device, a frame portion, and an inner frame that can be attached to the frame portion or the like and adjusted to a visual acuity or a body shape of an observer being a user. The first display device is configured by combining a first light-guiding device transparently covering the front of the eye of the observer, and a first image forming main body added to the frame portion. The second display device is also configured by combining a second light-guiding device and a second image forming main body similar to the first light-guiding device and first image forming main body. The frame portion includes an outer member covering the first image forming main body, and an outer member covering the second image forming main body.

The inner frame is provided between the first display device and the second display device having optical configurations of the head-mounted display. The inner frame includes a pair of frame portions into which eyeglass lenses for visual acuity correction are inserted, a pair of temple portions extending rearward from both right and left ends of the pair of frame body portions, and a nose pad attached to a center portion between the pair of frame body portions.

Further, the inner frame is arranged in front of the eyes of the observer by the nose pad supported on the nose and the pair of temple portions supported on the sides of the head such as the ears and the temples, and the head-mounted display is mounted on the observer.

The head-mounted display described in JP-A-2016-180939 has a configuration in which the inner frame is replaceable for each observer, and thus a space for replacing the inner frame is required to be secured between the first display device and the second display device. Therefore, the interval between the first display device and the second display device is required to be increased, and hence the size of the head-mounted display is liable to be increased.

In contrast, it is conceivable to provide a right-side support portion to an outer casing on the observer's right side rotatably supporting a right temple portion and a left-side support portion to an outer casing on the observer's left side rotatably supporting a left temple portion, to reduce the size of the head-mounted display apparatus. Furthermore, in order to improve a fitting property to the head, it is conceivable to provide the right-side support portion on a left side surface of the right-side outer casing and the left-side support portion on a right side surface of the left-side outer casing, to arrange the right-side temple portion and the left-side temple portion at positions near the head of the observer.

However, when the left-side temple portion is to be opened outward in a state in which the extending left-side temple portion abuts on the right side surface of the outer casing on the left side and the extending right-side temple portion abuts the left side surface of the outer casing on the right side, a fulcrum of the left-side temple portion at the time of bending is a most-rearward contact point of the left-side temple portion and the outer casing on the left side. The same applies to a case where the right temple portion is to be opened outward.

Thus, when the fulcrum of each temple portion is positioned on a rear end of the outer casing on the right side or the left side, there may be a risk that the user cannot easily wear the head-mounted display apparatus because a flexible region of each temple portion is small. In particular, the risk is noticeable when a user with a small head is to wear the head-mounted display apparatus.

In view of the above circumstances, a head-mounted display apparatus capable of enhancing a fitting property is desired.

SUMMARY

A head-mounted display apparatus according to one aspect of the present disclosure is a head-mounted display apparatus including a frame extending in a first direction, a display unit configured to emit image light in a second direction intersecting the first direction, a casing attached to one end, in the first direction, of the frame and housing a part of the display unit, and a temple portion arranged on a center side of the head-mounted display device, in the first direction, with respect to the casing. The casing includes a side surface positioned on a side on which the temple portion is arranged, and a first recessed portion, in the side surface, opening in the second direction to form a first gap with the temple portion, the temple portion being arranged along the side surface.

In the above-mentioned aspect, the temple portion may include, in a state of being arranged along the side surface, a second recessed portion into which a part of the casing is fitted.

In the above-mentioned aspect, the temple portion may include, in a state of being arranged along the side surface, a protruding portion abutting the side surface, and the protruding portion may have elasticity.

In the above-mentioned aspect, the temple portion may include an opening surrounding a part of the protruding portion.

In the above-mentioned aspect, the casing may include a temple support portion provided on the side surface and configured to support the temple portion, the temple portion may include a first coupling portion and a second coupling portion sandwiching the temple support portion in a third direction intersecting the first direction and the second direction and supported by the temple support portion, the temple support portion may include a first attaching portion to which the first coupling portion is attached and a second attaching portion to which the second coupling portion is attached, and a second gap may be formed between the first attaching portion and the second attaching portion in the third direction.

In the above-mentioned aspect, the display unit may include an image emitting unit arranged in the casing in the second direction and configured to emit the image light, and a light-guiding unit arranged in the first direction and configured to guide, to a predetermined viewing position, the image light emitted from the image emitting unit.

In the above-mentioned aspect, the casing may include a temple support portion provided to the side surface and configured to support the temple portion, and the temple support portion may be arranged in a direction being opposite to the second direction from a center, in the second direction, of the side surface.

In the above-mentioned aspect, the frame may be formed of metal, and the image emitting unit may be fixed to the frame.

In the above-mentioned aspect, the casing may include an inner casing provided in the casing, and the inner casing may include a raised portion positioned between the image emitting unit and the side surface.

DESCRIPTION OF EXEMPLARY EMBODIMENTS

First Exemplary Embodiment

A first exemplary embodiment of the present disclosure is described below with reference to the drawings.

Overall Configuration of Head-Mounted Display Apparatus

Figure 1:
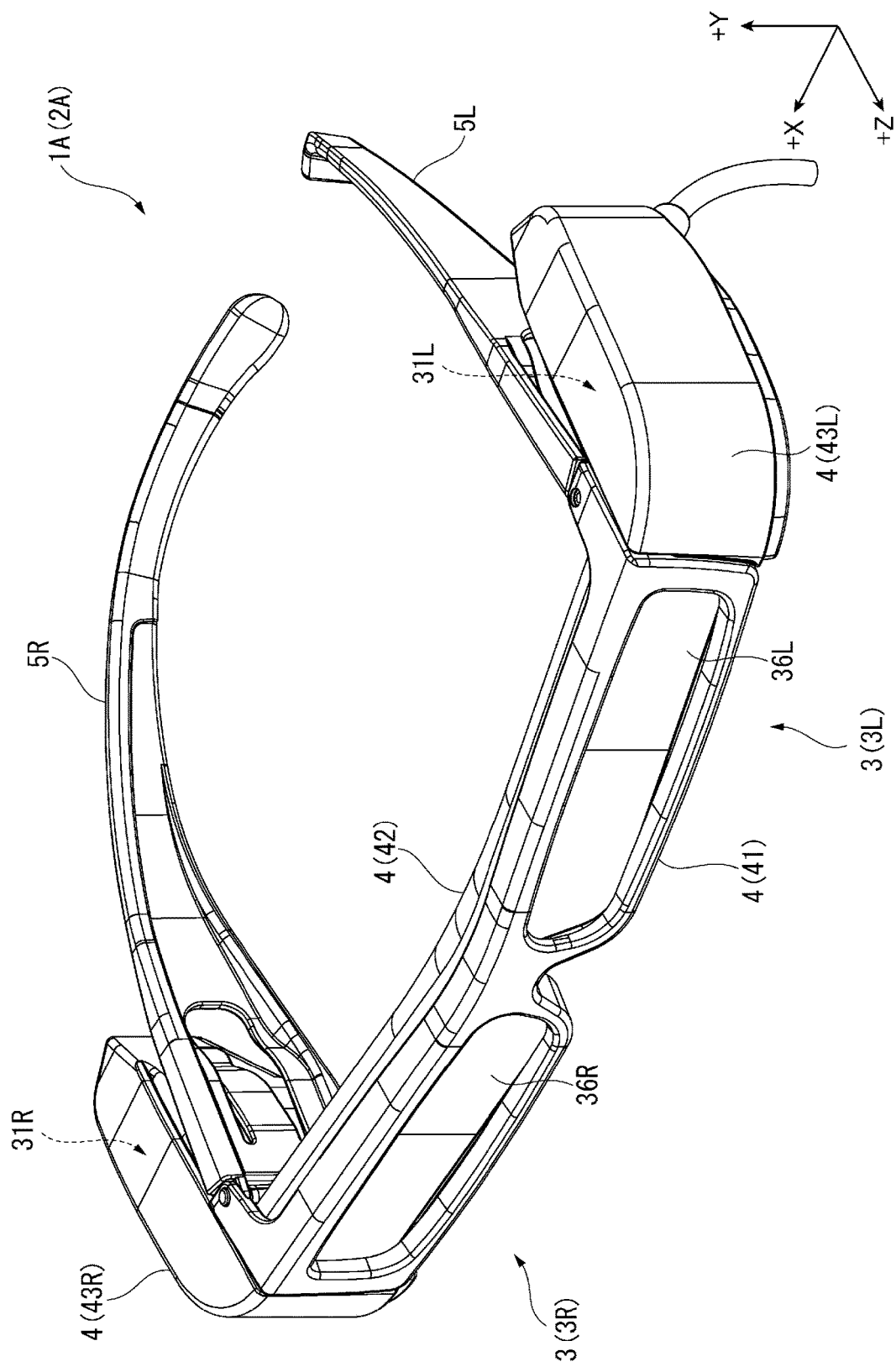
FIG. 1 is a perspective view for illustrating a head-mounted display apparatus according to a first exemplary embodiment.
Figure 2:
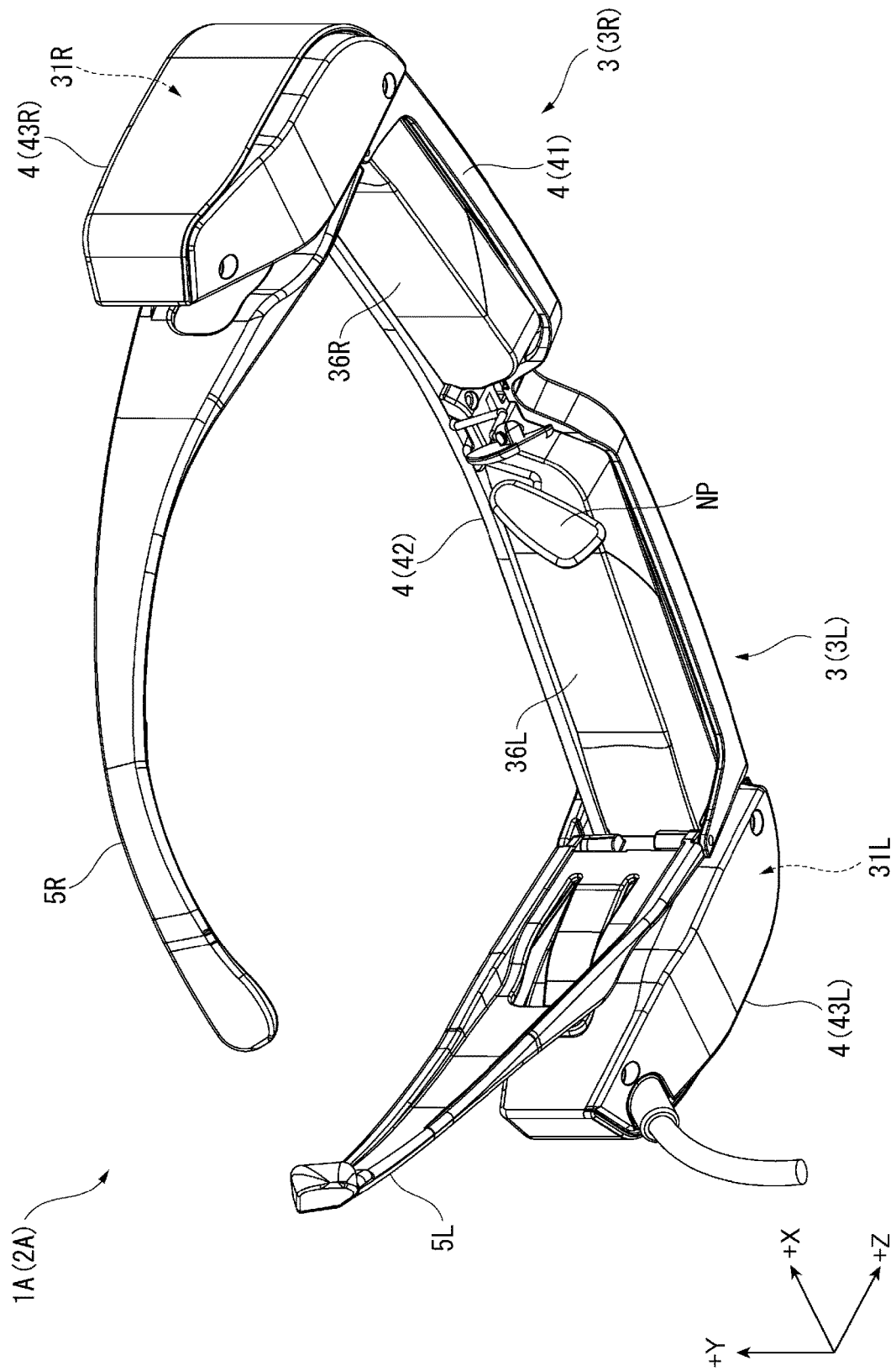
FIG. 2 is a perspective view for illustrating the head-mounted display apparatus according to the first exemplary embodiment.
Figure 3:
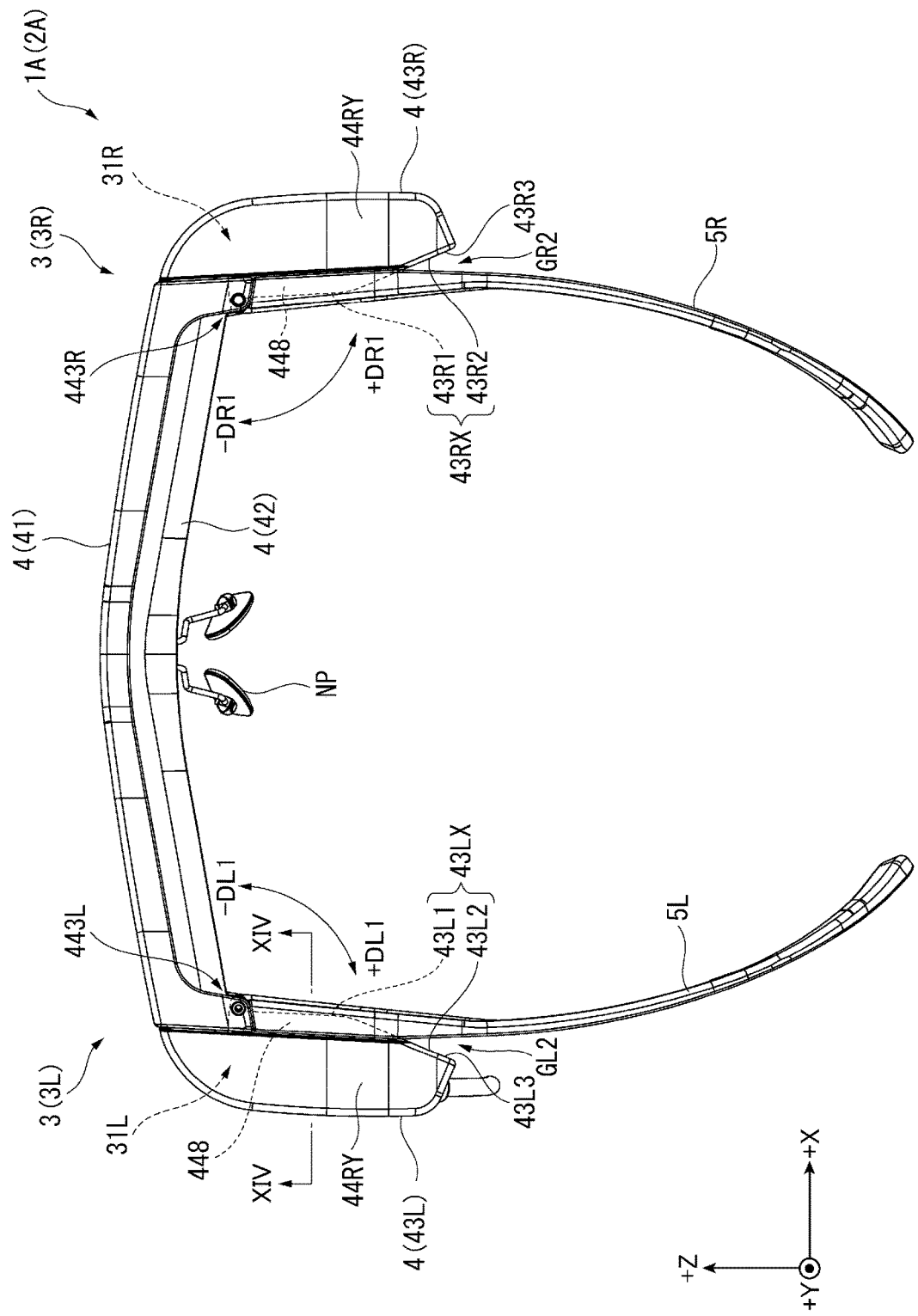
FIG. 3 is a plan view for illustrating the head-mounted display apparatus according to the first exemplary embodiment.

FIGS. 1 and 2 are perspective views for illustrating a head-mounted display apparatus 1A according to the present exemplary embodiment viewed from above on the front side and from below on the back side. Further, FIG. 3 is a plan view for illustrating the head-mounted display apparatus 1A when viewed from above.

The head-mounted display apparatus 1A according to the present exemplary embodiment is a so-called Head Mounted Display (HMD) used by being mounted on a head of a user and displays an image visually recognizable by the user. As illustrated in FIGS. 1 to 3, the head-mounted display apparatus 1A includes a device main body 2A including a display unit 3, a support portion 4, temple portions 5L and 5R, and a nose pad NP. In addition to these, the head-mounted display apparatus 1A may include a cover member mounted on the device main body 2A and covering a left-side light-guiding unit 36L and a right-side light-guiding unit 36R forming the display unit 3.

As described in detail below, the display unit 3 includes a left-side display unit 3L and a right-side display unit 3R configured to display images. The support portion 4 includes a mounting member 41, a frame 42, a left-side casing 43L, and a right-side casing 43R, and supports the display unit 3, the temple portions 5L and 5R, and the nose pad NP. The temple portions 5L and 5R are suspended from the left ear and the right ear of the user, and the nose pad NP abuts the nose of the user. In this manner, the head-mounted display apparatus 1A is mounted on the heads of the user.

Hereinafter, the configuration of the head-mounted display apparatus 1A is described in detail.

In the following description, three directions orthogonal to each other are a +X direction, a +Y direction, and a +Z direction, and a direction from the back side to the front side of the head-mounted display apparatus 1A is referred to as the +Z direction. Additionally, a direction from the right side to the left side of the head-mounted display apparatus 1A when viewed in the +Z direction is referred to as the +X direction, and a direction from the lower side to the upper side of the head-mounted display apparatus 1A when viewed in the +Z direction is referred to as the +Y direction.

Also, although not illustrated, for convenience of description, the opposite directions of the +X direction, the +Y direction, and the +Z direction are referred to as a −X direction, a −Y direction, and a −Z direction, respectively.

In the present exemplary embodiment, a second direction in which the display unit 3 emits image light described later is referred to as the −Z direction. Further, a first direction in which the frame 42 extends is referred to as the +X direction, and a direction intersecting the first direction and a second direction is referred to as the +Y direction. Specifically, the +X direction being the first direction is a direction from the left-side display unit 3L to the right-side display unit 3R among the left-side display unit 3L and the right-side display unit 3R forming the display unit 3. Further, the +X direction is a direction from a left-side emitting unit 31L forming the left-side display unit 3L to a right-side emitting unit 31R forming the right-side display unit 3R. Moreover, the +X direction is a direction from a shaft support portion 443L supporting the temple portion 5L in the left-side casing 43L, to a shaft support portion 443R supporting the temple portion 5R in the right-side casing 43R.

Note that, for the user wearing the head-mounted display apparatus 1A, the +X direction is a direction from the left side to the right side, the +Y direction is a direction from the lower side to the upper side, and the +Z direction is a direction from the back side to the front side.

Thus, in the configuration of the head-mounted display apparatus 1A, components on the left side of the user, that is, components arranged in the −X direction, are denoted with the symbol "L", and components on the right side of the user, that is, components arranged in the +X direction, are denoted with the symbol "R".

Configuration of Support Portion

Figure 4:
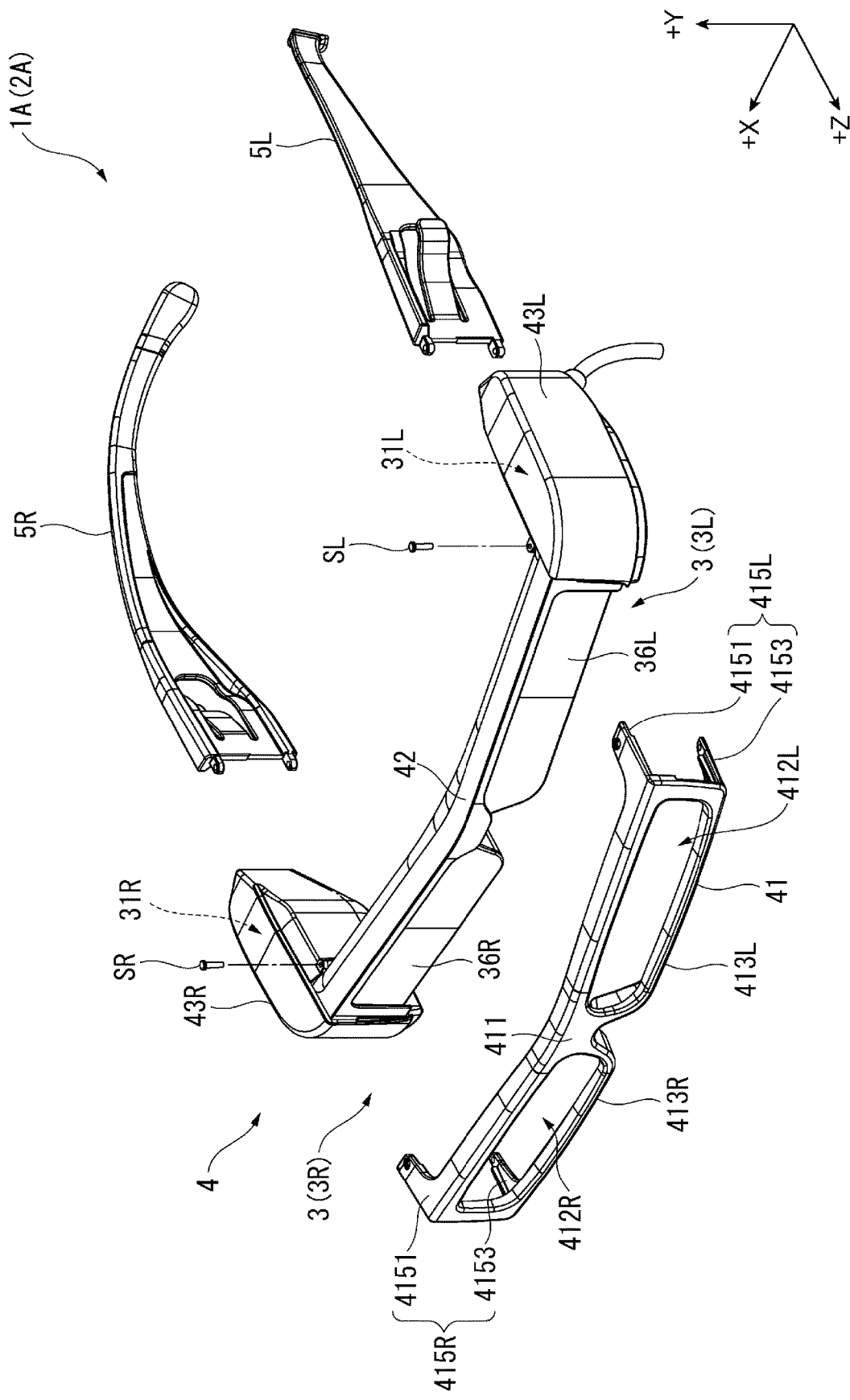
FIG. 4 is an exploded perspective view for illustrating the head-mounted display apparatus according to the first exemplary embodiment.
Figure 5:
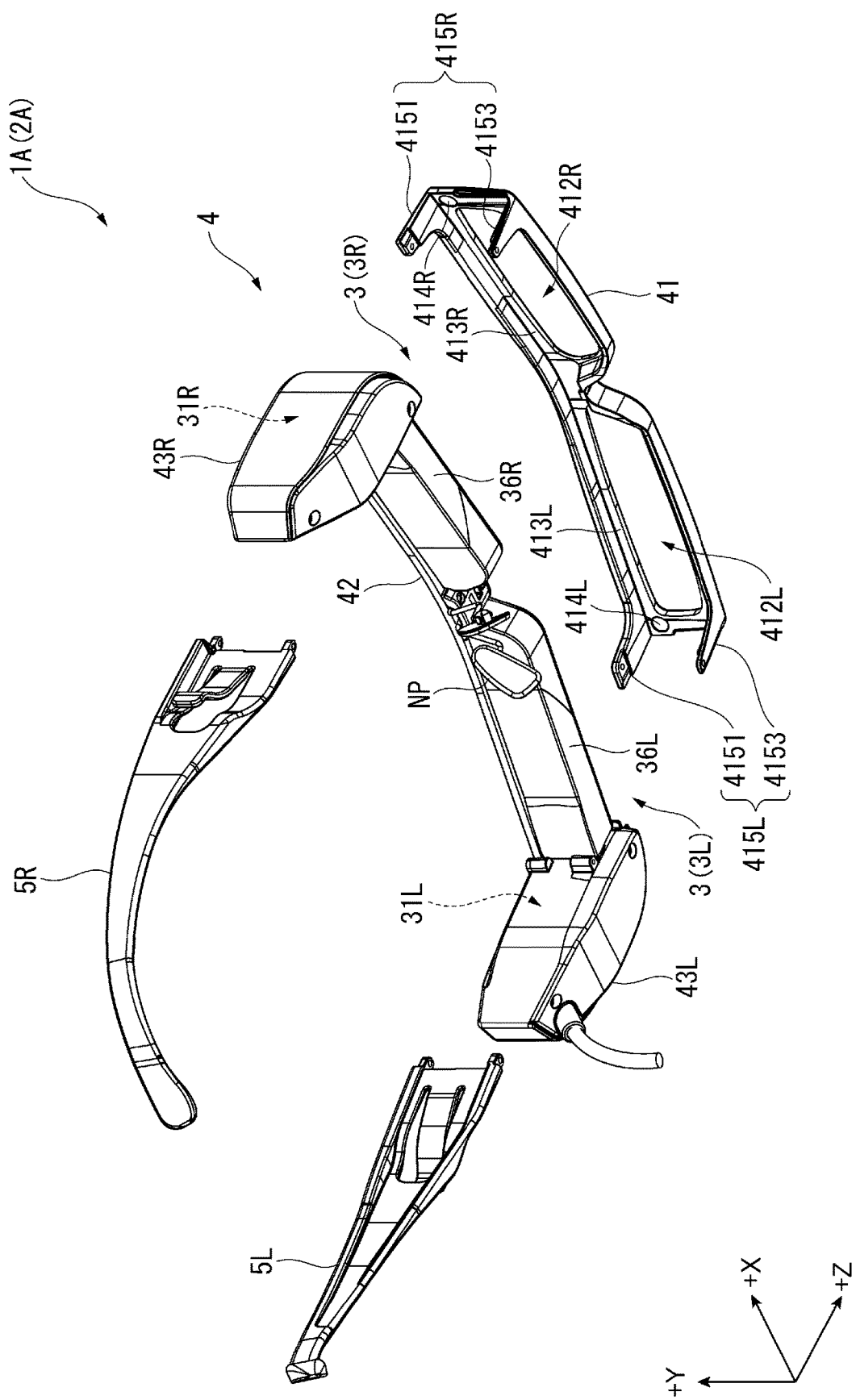
FIG. 5 is an exploded perspective view for illustrating the head-mounted display apparatus according to the first exemplary embodiment.

FIG. 4 and FIG. 5 are exploded perspective views for illustrating the head-mounted display apparatus 1A from above on the front side and from below on the rear side. More specifically, FIG. 4 and FIG. 5 are exploded perspective views for illustrating the head-mounted display apparatus 1A in which the mounting member 41 of the support portion 4 and the temple portions 5L and 5R are separated from each other.

Here, firstly, the support portion 4 is described.

The support portion 4 supports the display unit 3 and the nose pad NP, and rotatably supports the temple portions 5L and 5R. As illustrated in FIG. 4 and FIG. 5, the support portion 4 includes the mounting member 41, the frame 42, the left-side casing 43L, and the right-side casing 43R.

Configuration of Mounting Member

The mounting member 41 is fixed to the right-side casing 43R and the left-side casing 43L in a state of covering the frame 42, and the right-side light-guiding unit 36R and the left-side light-guiding unit 36L forming the display unit 3, in the +Z direction. The mounting member 41 is a portion in which the cover member is attachably mounted in the +Z direction.

The mounting member 41 includes a main body 411 arranged in the +Z direction with respect to the left-side light-guiding unit 36L and the right-side light-guiding unit 36R and fixing portions 415L and 415R extending from the main body 411 in the −Z direction.

The main body 411 includes a left-side frame portion 413L forming a left-side opening 412L and a right-side frame portion 413R forming a right-side opening 412R. In addition, as illustrated in FIG. 5, the main body 411 includes magnets 414L and 414R attracting the cover member.

As illustrated in FIG. 4 and FIG. 5, the left-side frame portion 413L surrounds a region positioned in the +Z direction with respect to the left-side light-guiding unit 36L and including a display region of a left-eye image displayed by the left-side light-guiding unit 36L when viewed in the +Z direction.

The right-side frame portion 413R surrounds a region positioned in the +Z direction with respect to the right-side light-guiding unit 36R and including a display region of a right-eye image displayed by the right-side light-guiding unit 36R when viewed in the +Z direction.

When the user observes surroundings through the left-side light-guiding unit 36L and the right-side light-guiding unit 36R, a line-of-sight of the user passes through the left-side opening 412L and the right-side opening 412R.

As illustrated in FIG. 5, the magnet 414L is provided at a corner formed by the −X direction and the +Y direction on a −Z direction plane in the main body 411. The magnet 414R is provided at a corner formed by the +X direction and the +Y direction on a −Z direction plane in the main body 411.

As illustrated in FIG. 4 and FIG. 5, the fixing portion 415L is provided at a position in the vicinity of the −X direction end of the main body 411. The fixing portion 415L includes an upper arm portion 4151 extending in the −Z direction from the +Y direction end edge of the main body 411, and a lower arm portion 4153 extending in the −Z direction from the −Y direction end edge of the main body 411.

The fixing portion 415R is provided at a position in the vicinity of the +X direction end of the main body 411, and similar to the fixing portion 415L, includes the upper arm portion 4151 and the lower arm portion 4153.

Further, the upper arm portion 4151 and the lower arm portion 4153 of the fixing portion 415L are fixed to the shaft support portion 443L of the left-side casing 43L to be described later, with a screw SL, and the upper arm portion 4151 and the lower arm portion 4153 of the fixing portion 415R are fixed to the shaft support portion 443R of the right-side casing 43R with a screw SR. In this manner, the mounting member 41 is fixed to the left-side casing 43L and the right-side casing 43R.

Configuration of Frame

Figure 6:
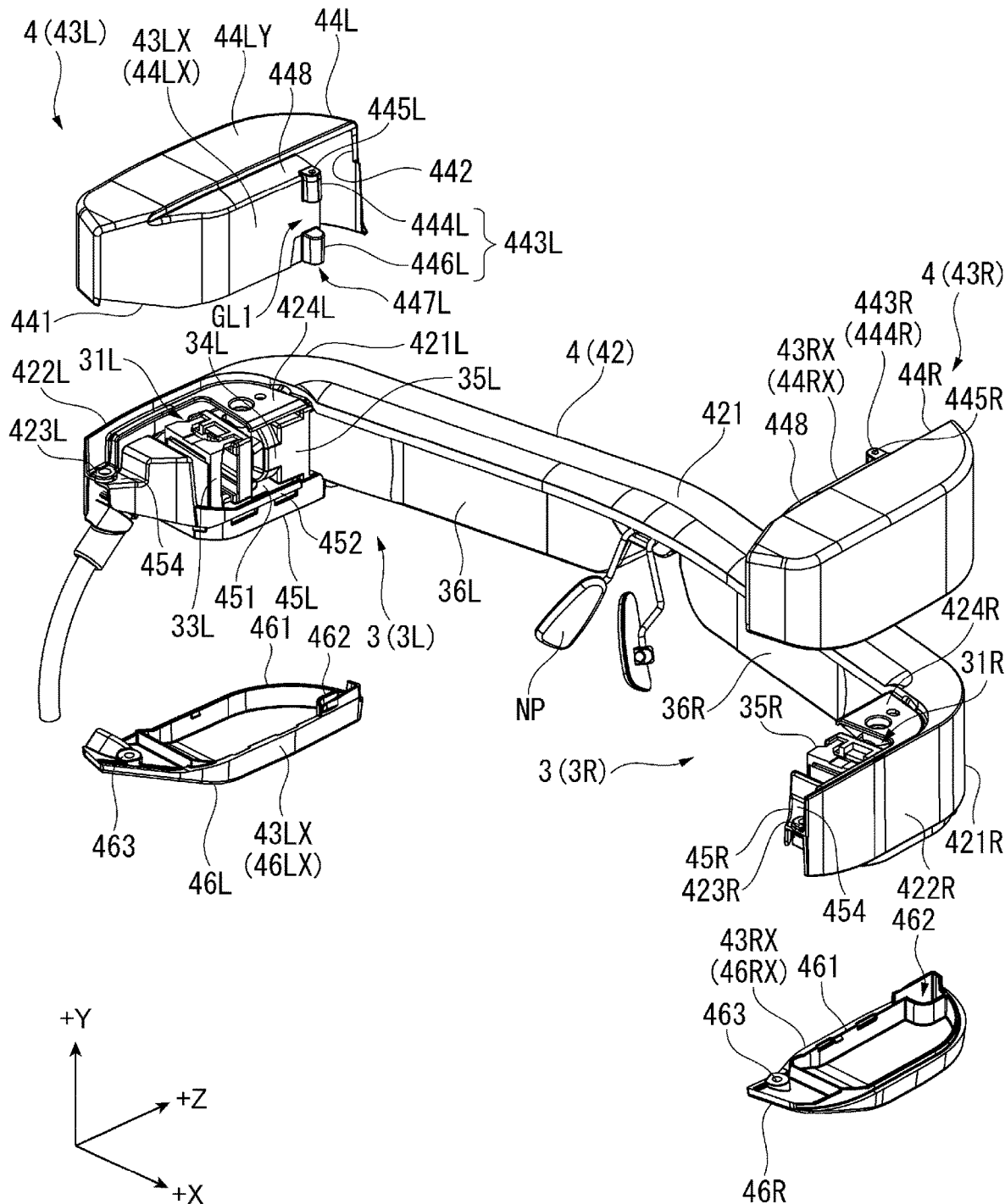
FIG. 6 is an exploded perspective view for illustrating a support portion in the first exemplary embodiment.
Figure 7:
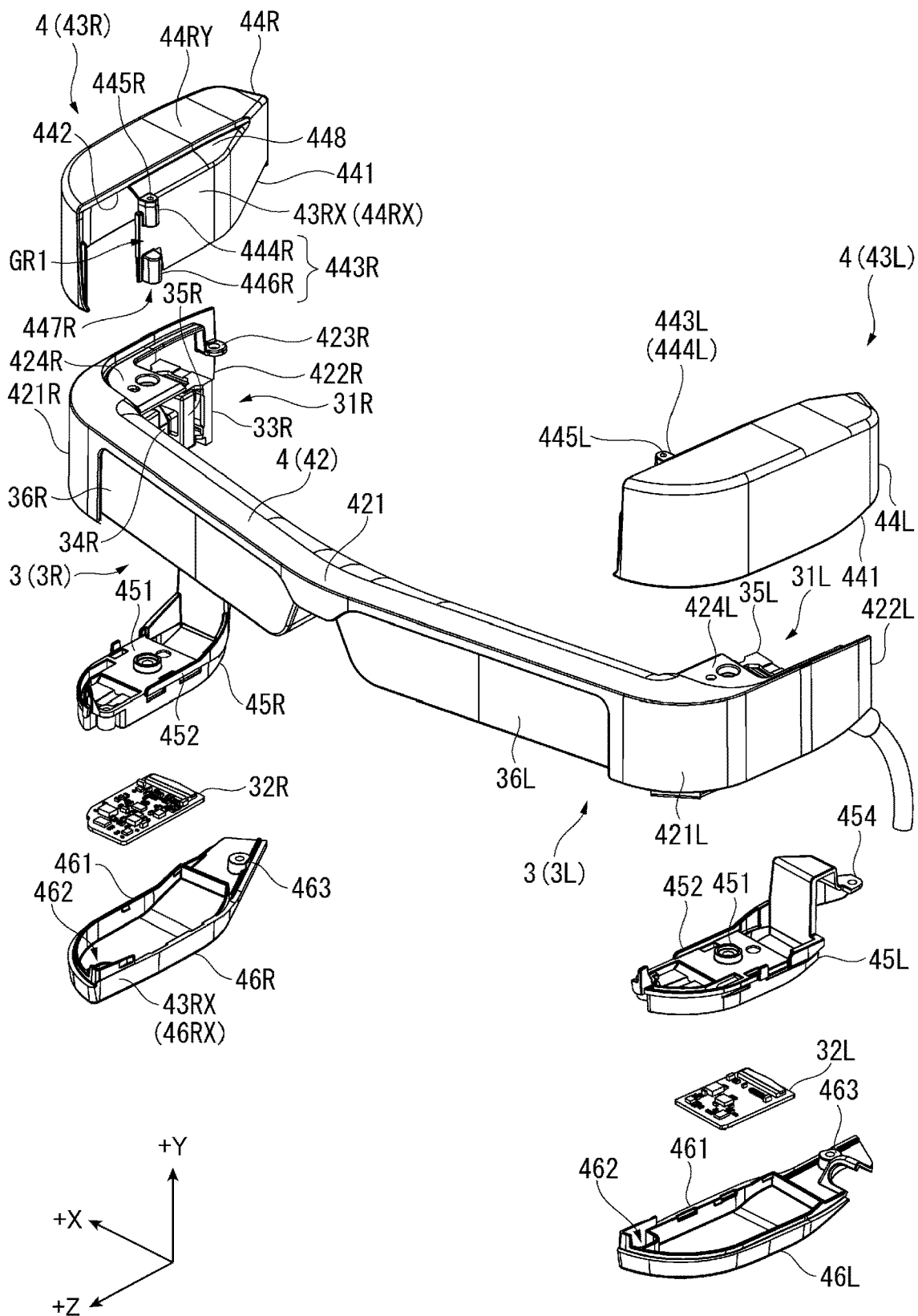
FIG. 7 is an exploded perspective view for illustrating display units and the support portion in the first exemplary embodiment.
Figure 8:
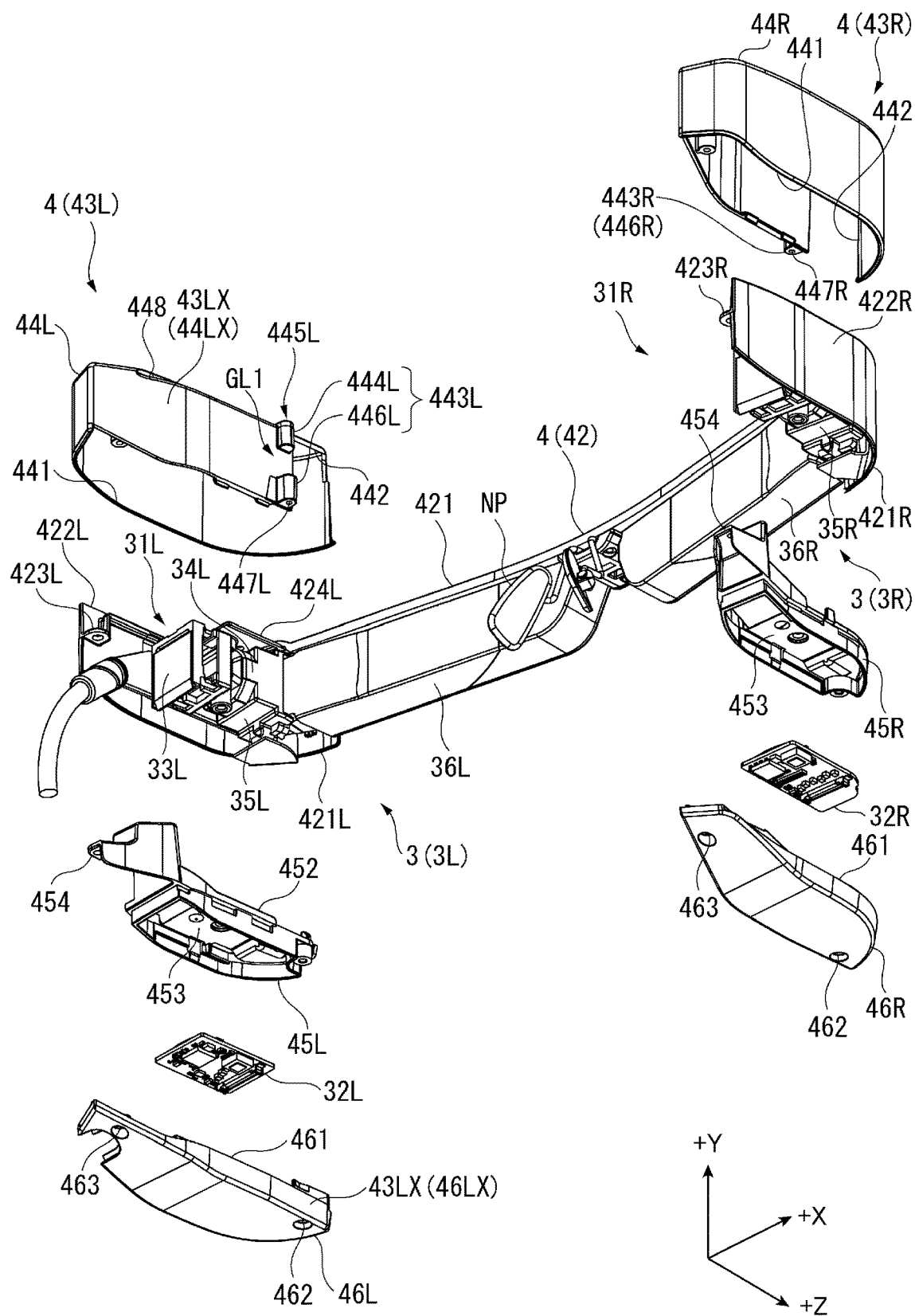
FIG. 8 is an exploded perspective view for illustrating the display units and the support portion in the first exemplary embodiment.

FIG. 6 is an exploded perspective view for illustrating the support portion 4. More specifically, FIG. 6 is a perspective view for illustrating the left-side casing 43L and the right-side casing 43R from which the frame 42, upper casings 44L and 44R, and lower casings 46L and 46R are separated, when viewed from above on the rear side. FIG. 7 and FIG. 8 are exploded perspective views for illustrating the display unit 3 and the support portion 4. More specifically, FIG. 7 and FIG. 8 are exploded perspective views of the right-side display unit 3R, the left-side display unit 3L, the right-side casing 43R, and the left-side casing 43L when viewed from above on the front side and from below on the back side.

The frame 42 is a metal member having a substantially U-like shape when viewed in the +Y direction, and is arranged in the +X direction being the first direction. In other words, one end of the frame 42 is positioned in the −X direction, and the other end thereof is positioned in the +X direction.

As illustrated in FIG. 6 to FIG. 8, the frame 42 includes a front portion 421 along the forehead of the user, and side surface portions 422L and 422R extending in the −Z direction from the ±X direction ends of the front portion 421.

The front portion 421 is a portion of the frame 42 along the XZ plane. The front portion 421 supports the left-side light-guiding unit 36L and the right-side light-guiding unit 36R of the display unit 3 to be described later, and also supports the nose pad NP arranged between the light-guiding units 36L and 36R.

In the front portion 421, a right-side end 421R positioned in the +X direction and a left-side end 421L positioned in the −X direction are curved in an arc shape in the −Z direction when viewed in the +Y direction.

The side surface portion 422R extends in the −Z direction from the right-side end 421R. At the −Z direction end of the side surface portion 422R on a −X direction plane, a casing fixing portion 423R to which an inner casing 45R of the right-side casing 43R described later is fixed is provided.

At a +Y direction portion at which the side surface portion 422R and the front portion 421 cross with each other, a mirror-barrel fixing portion 424R to which a mirror barrel 35R forming the right-side emitting unit 31R of the right-side display unit 3R to be described later, is fixed is provided.

The side surface portion 422L extends in the −Z direction from the left-side end 421L. At the −Z direction end of the side surface portion 422L on a +X direction plane, a casing fixing portion 423L to which an inner casing 45L of the left-side casing 43L described later is fixed is provided.

At a +Y direction portion at which the side surface portion 422L and the front portion 421 cross each other, a mirror-barrel fixing portion 424L to which a mirror barrel 35L forming the left-side emitting unit 31L of the left-side display unit 3L to be described later, is fixed is provided.

Configuration of Left-Side Casing

The left-side casing 43L is attached to the −X direction end of the frame 42, and houses the left-side emitting unit 31L of the left-side display unit 3L described later.

As illustrated in FIG. 6 to FIG. 8, the left-side casing 43L includes the upper casing 44L, the inner casing 45L, and the lower casing 46L.

Configuration of Upper Casing

The upper casing 44L is a member covering the left-side emitting unit 31L in the +Y direction. More specifically, the upper casing 44L is a box-shaped casing housing inside the mirror barrel 35L and the side surface portion 422L forming the left-side emitting unit 31L inside through an opening 441 opening in the −Y direction and arranged so as to cover the mirror barrel 35L and the side surface portion 422L in the +Y direction, the ±X direction, and the ±Z direction.

The upper casing 44L includes an opening 442, the shaft support portion 443L provided on a +X direction surface 44LX, and a step portion 448 provided on a +Y direction surface 44LY.

The opening 442 is an opening through which the front portion 421 and the left-side light-guiding unit 36L are arranged inside when the upper casing 44L is attached to the frame 42.

The shaft support portion 443L rotatably supports the temple portion 5L, and is a portion to which the fixing portion 415L of the mounting member 41 is fixed. In other words, the shaft support portion 443L is a temple support portion supporting the temple portion 5L. The shaft support portion 443L is a side surface, on the temple portion 5L side, of the left-side casing 43L, and is positioned on a +X direction side surface 43LX including the surface 44LX, from the −Z direction center, the −Z direction being the second direction, in the +Z direction. More specifically, the shaft support portion 443L is provided at the end of the surface 44LX in the +Z direction. Thus, on the surface 44LX, the shaft support portion 443L is arranged in the vicinity of a crossing portion of the mirror barrel 35L of the left-side emitting unit 31L described later arranged in the −Z direction being the second direction, and the left-side light-guiding unit 36L to be described later arranged in the +X direction being the first direction.

The shaft support portion 443L includes a first attaching portion 444L positioned in the +Y direction and a second attaching portion 446L positioned in the −Y direction.

The first attaching portion 444L includes a screw hole 445L. The screw SL (see FIG. 4) inserted through the upper arm portion 4151 of the fixing portion 415L and a through-hole 5L21 of the temple portion 5L described later in the −Y direction, is screwed into the screw hole 445L.

The second attaching portion 446L includes a screw hole 447L. A screw (not shown) inserted through the lower arm portion 4153 of the fixing portion 415L and a through-hole 5L31 of the temple portion 5L described later in the +Y direction, is screwed into the screw hole 447L.

The first attaching portion 444L and the second attaching portion 446L are arranged with a predetermined gap in the +Y direction. In other words, a gap GL1 being a second gap is formed between the first attaching portion 444L and the second attaching portion 446L in the +Y direction being the third direction. The gap GL1 is a portion in which the left temple of glasses is arranged when the user wearing the glasses wears the head-mounted display apparatus 1A.

The step portion 448 is a portion recessed in the −Y direction in the −X direction end edge of the surface 44LY in the +Y direction. The step portion 448 is arranged in a recessed portion 5L5 of the temple portion 5L when the temple portion 5L axially supported by the shaft support portion 443L is arranged in the +Z direction.

Configuration of Inner Casing

The inner casing 45L is a member fixed to the mirror barrel 35L so as to cover the mirror barrel 35L of the left-side emitting unit 31L in the −Y direction and supporting a control unit 32L positioned in the −Y direction. In other words, the inner casing 45L is arranged in a space formed by combining the upper casing 44L and the lower casing 46L. The inner casing 45L includes an attaching portion 451, a raised portion 452, a support portion 453, and a fixing portion 454.

The attaching portion 451 is a portion fixed to the mirror barrel 35L, and is positioned on the +Y direction plane.

The raised portion 452 is a rib raised in the +Y direction from the +X direction end edge on the +Y direction plane.

The support portion 453 is a portion supporting the control unit 32L forming the left-side emitting unit 31L, and is positioned on the −Y direction plane.

The fixing portion 454 is a portion fixed to the casing fixing portion 423L of the side surface portion 422L, and is positioned on the −Z direction end.

Configuration of Lower Casing

The lower casing 46L covers the inner casing 45L in the −Y direction, and at the same time, houses the left-side emitting unit 31L by being combined with the upper casing 44L. The lower casing 46L includes a coupling portion 461 and fixing portions 462 and 463.

The coupling portion 461 is raised in the +Y direction from the peripheral edge of the lower casing 46L on the +Y direction plane in the +Y direction, and is coupled to the end edge of the opening 441 of the upper casing 44L. The inner casing 45L is arranged in the coupling portion 461.

The fixing portion 462 is positioned in the +Z direction, and the fixing portion 463 is positioned in the −Z direction. The fixing portion 462 is fixed to the inner casing 45L fixed to the frame 42 through the mirror barrel 35L, and the fixing portion 463 is fixed to the upper casing 44L. In this manner, the upper casing 44L, the inner casing 45L, and the lower casing 46L are combined to form the left-side casing 43L.

The +X direction side surface 43LX of the left-side casing 43L is a side surface oriented toward the +X direction center of the head-mounted display apparatus 1A. The side surface 43LX is formed of the +X direction surface 44LX of the upper casing 44L and a +X direction surface 46LX of the lower casing 46L. The portion of the side surface 43LX in the −Z direction is inclined so as to be positioned in the −X direction as heading in the −Z direction as illustrated in FIG. 3. In other words, the side surface 43LX includes an abutting surface 43L1 positioned in the +Z direction portion and extending along the temple portion 5L to abut the temple portion 5L, and an inclined surface 43L2 positioned in the −Z direction portion and positioned in the −X direction being a direction becoming away from the temple portion 5L as heading in the −Z direction. In this manner, the −Z direction portion of the left-side casing 43L is cut in the +X direction. In other words, the left-side casing 43L includes a recessed portion 43L3 being a first recessed portion opened in the −Z direction and forms a gap GL2 as a first gap between the left-side casing 43L and the temple portion 5L in an unfolded state to be described later.

Actions and effects obtained by forming the gap GL2 are described later.

Configuration of Right-Side Casing

As illustrated in FIG. 7 and FIG. 8, the right-side casing 43R includes the upper casing 44R, the inner casing 45R, and the lower casing 46R having a mirror symmetrical structure with the upper casing 44L, the inner casing 45R, and the lower casing 46R.

Of those, the inner casing 45R includes the attaching portion 451, the raised portion 452, the support portion 453, and the fixing portion 454 similar to those of the inner casing 45L. The lower casing 46R includes the coupling portion 461 and the fixing portions 462 and 463 similar to those of the lower casing 46L.

Note that the inner casing 45R and the lower casing 46R are mirror symmetric to the inner casing 45L and the lower casing 46L, and hence a detailed description thereof is omitted.

The upper casing 44R is attached to the +X direction end of the frame 42 and combined with the lower casing 46R, to house the right-side emitting unit 31R. Similar to the upper casing 44L, the upper casing 44R includes the opening 442, the shaft support portion 443R provided on a −X direction surface 44RX, and the step portion 448 provided on a +Y direction surface 44RY.

Of those, the shaft support portion 443R rotary supports the temple portion 5R, and is a portion to which the fixing portion 415R of the mounting member 41 is fixed. In other words, the shaft support portion 443R is a temple support portion supporting the temple portion 5R. The shaft support portion 443R is a side surface, on the temple portion 5R side, of the right-side casing 43R, and is positioned on a +X direction side surface 43RX including the surface 44RX, from the −Z direction center, the −Z direction being the second direction, in the +Z direction. More specifically, the shaft support portion 443R is provided on the +Z direction end of the surface 44RX. Thus, on the surface 44RX, the shaft support portion 443R is arranged in the vicinity of a crossing point of a mirror barrel 35R of the right-side emitting unit 31R described later arranged in the −Z direction being the second direction, and the right-side light-guiding unit 36R described later arranged in the +X direction being the first direction.

The shaft support portion 443R includes a first attaching portion 444R positioned in the +Y direction and a second attaching portion 446R positioned in the −Y direction.

The first attaching portion 444R includes a screw hole 445R. The screw SR (see FIG. 4) inserted through the upper arm portion 4151 of the fixing portion 415R and a through-hole 5R21 of the temple portion 5R described later in the −Y direction, is screwed into the screw hole 445R.

The second attaching portion 446R includes a screw hole 447R. A screw (not shown) inserted through the lower arm portion 4153 of the fixing portion 415R and a through-hole 5R31 of the temple portion 5R described later in the +Y direction, is screwed into the screw hole 447R.

The first attaching portion 444R and the second attaching portion 446R are arranged with a predetermined interval in the +Y direction. In other words, a gap GR1 being a second gap is formed between the first attaching portion 444R and the second attaching portion 446R in the +Y direction being the third direction. Similar to the gap GL1, the gap GR1 is a portion in which a right temple of glasses is arranged when the user wearing the glasses wears the head-mounted display apparatus 1A.

The −X direction side surface 43RX of the right-side casing 43R is a side surface oriented to the +X direction center of the head-mounted display apparatus 1A. The side surface 43RX is formed of the −X direction surface 44RX of the upper casing 44R and a −X direction surface 46RX of the lower casing 46R. The portion of the side surface 43RX in the −Z direction is inclined so as to be positioned in the +X direction as heading in the −Z direction as illustrated in FIG. 3. In other words, the side surface 43RX includes an abutting surface 43R1 positioned in the +Z direction portion and extending along the temple portion 5R to abut the temple portion 5R, and an inclined surface 43R2 positioned in the −Z direction portion and positioned in the +X direction being a direction becoming away from the temple portion 5R as heading in the −Z direction. In this manner, the portion of the right-side casing 43R in the −Z direction is cut in the −X direction. In other words, the right-side casing 43R includes a recessed portion 43R3 being a first recessed portion opened in the −Z direction and forming a gap GR2 as a first gap between the right-side casing 43R and the temple portion 5R in an unfolded state to be described later.

Actions and effects obtained by forming the gap GR2 are described later.

Configuration of Display Unit

The display unit 3 emits image light to a predetermined viewing position and displays an image formed by the image light. The predetermined viewing position is a position of an exit pupil formed by an optical system forming the display unit 3. In the present exemplary embodiment, the predetermined viewing position is set to an imaginary position corresponding to each of the left eye and the right eye of the user.

Further, as illustrated in FIG. 6 to FIG. 8, the display unit 3 includes the left-side display unit 3L configured to display a left-eye image by emitting left-eye image light to the left eye of the user being one viewing position, and the right-side display unit 3R configured to display a right-eye image by emitting right-eye image light to the right eye of the user being another viewing position.

Configuration of Left-Side Display Unit

The left-side display unit 3L is positioned in the head-mounted display apparatus 1A in the −X direction. The left-side display unit 3L includes the left-side emitting unit 31L as an image emitting unit configured to emit the left-eye image light forming the left-eye image and the left-side light-guiding unit 36L as a light-guiding unit configured to guide the emitted left-eye image light to the left eye of the user.

The left-side emitting unit 31L is housed in the left-side casing 43L, and generates and emits left-eye image light in accordance with image information input from the outside. The left-side emitting unit 31L includes the control unit 32L, an image forming unit 33L, and an image projection unit 34L.

The control unit 32L outputs an image signal in accordance with the input image information to the image forming unit 33L, and causes the image forming unit 33L to generate left-eye image light in accordance with the image information. As illustrated in FIG. 7 and FIG. 8, the control unit 32L is supported by the inner casing 45L.

The image forming unit 33L is coupled to the control unit 32L with a flexible printed board (not shown) to generate the left-eye image light in accordance with the image signal input from the control unit 32L. In the present exemplary embodiment, the image forming unit 33L is formed of a self-luminous display panel such as an organic Electro-Luminescence (EL) panel. However, the image forming unit 33L is not limited thereto, and may be achieved by a combination of a light source, such as an LED, and a light modulation device, such as a device using a micro mirror exemplified by a liquid crystal panel and a MEMS mirror.

The image projection unit 34L projects the left-eye image light generated by the image forming unit 33L to the left-side light-guiding unit 36L. As illustrated in FIG. 6 and FIG. 8, the image projection unit 34L includes the mirror barrel 35L and a lens or a prism (not shown) arranged in the mirror barrel 35L. The mirror barrel 35L is integrated with the image forming unit 33L, and the mirror barrel 35L is fixed to the mirror-barrel fixing portion 424L of the frame 42 in the −Z direction being the second direction. Further, the inner casing 45L is fixed to the mirror barrel 35L.

The left-side light-guiding unit 36L is supported by the frame 42 as described above, and is arranged in the +X direction being the first direction at a position corresponding to the left eye of the user as illustrated in FIG. 6 to FIG. 8. The left-side light-guiding unit 36L internally reflects the emitted left-eye image light from the image projection unit 34L on an interface, guides the light in the +X direction, and emits the light to the left eye through a semitransparent layer provided correspondingly to the eye ball of the left eye of the user. In other words, the left-side display unit 3L emits the left-eye image light from the left-side light-guiding unit 36L in the −Z direction being the second direction.

The left-side light-guiding unit 36L is formed of resin such as cycloolefin polymer having high transmittance in a visible light region, for example, and the user can observe surroundings through the left-side light-guiding unit 36L.

Configuration of Right-Side Display Unit

The right-side display unit 3R is positioned in the device main body 2A in the +X direction. As illustrated in FIG. 6 to FIG. 8, the right-side display unit 3R includes the right-side emitting unit 31R as an image emitting unit configured to emit the right-eye image light forming the right-eye image and the right-side light-guiding unit 36R as a light-guiding unit configured to guide the emitted right-eye image light to the right eye of the user.

The right-side emitting unit 31R is housed in the right-side casing 43R, and generates and emits the right-eye image light in accordance with the image information input from the outside. Similar to the left-side emitting unit 31L, the right-side emitting unit 31R includes a control unit 32R, an image forming unit 33R, and an image projection unit 34R.

The control unit 32R outputs an image signal in accordance with the input image information to the image forming unit 33R, and causes the image forming unit 33R to generate the right-eye image light in accordance with the image information. The control unit 32R supports the inner casing 45R.

The image forming unit 33R generates the right-eye image light corresponding to an image signal input from the control unit 32L.

The image projection unit 34R includes the mirror barrel 35R and a lens or a prism arranged in the mirror barrel 35R and projecting the right-eye image light to the right-side light-guiding unit 36R. The mirror barrel 35R is integrated with the image forming unit 33R, and the mirror barrel 35R is fixed to the right-side end portion 421R of the frame 42 in the −Z direction being the second direction. Further, the inner casing 45R is fixed to the mirror barrel 35R.

As described above, the right-side light-guiding unit 36R is supported by the frame 42, and is arranged in the +X direction being the first direction at a position corresponding to the right eye of the user. The right-side light-guiding unit 36R internally reflects the emitted right-eye image light from the right-side emitting unit 31R on an interface, guides the light in the −X direction, and emits the light to the right eye through a semitransparent layer provided correspondingly to the eye ball of the right eye of the user. In other words, the right-side display unit 3R emits the right-eye image light forming the right-eye image from the right-side light-guiding unit 36R in the −Z direction being the second direction. The right-side light-guiding unit 36R is formed of a material having transmittance similar to the left-side light-guiding unit 36L, for example, and the user can observe surroundings through the right-side light-guiding unit 36R.

As described above, the device main body 2A is a head-mounted display apparatus of a see-through type with which the user can observe an image and surroundings at the same time.

Configuration of Temple Portion

As illustrated in FIG. 3, the temple portion 5L is rotatably supported by the shaft support portion 443L of the left-side casing 43L in a +DL1 direction and a −DL1 direction about a rotary shaft in the +Y direction.

The temple portion 5R is rotatably supported by the shaft support portion 443R of the right-side casing 43R in a +DR1 direction and a −DR1 direction about a rotary shaft in the +Y direction. The temple portions 5L and 5R are unfolded in the −Z direction when the user wears the head-mounted display apparatus 1A on the head, and are suspended from the left ear and the right ear of the user. In other words, the temple portions 5L and 5R are mounting members to mount the head-mounted display apparatus 1A on the head of the user.

Note that, the +DL1 direction is a direction in which the temple portion 5L is unfolded outward, a direction becoming away from the temple portion 5R, and a clockwise direction when viewed in the +Y direction. The −DL1 direction is a direction opposite to the +DL1 direction, a direction in which the temple portion 5L is folded inward, a direction becoming close to the temple portion 5R, and an anti-clockwise direction when viewed in the +Y direction. Further, the +DR1 direction is a direction in which the temple portion 5R unfolds outward, a direction becoming away from the temple portion 5L, and an anti-clockwise direction when viewed in the +Y direction. The −DR1 direction is a direction opposite to the +DR1 direction, a direction in which the temple portion 5R is folded inward, a direction becoming close to the temple portion 5L, and a clockwise direction when viewed in the +Y direction.

Further, an unfolded state is an arrangement state in which the temple portions 5L and 5R are unfolded so that an extending direction from the shaft support portions 443L and 443R is in the −Z direction. Further, a bent state is an arrangement state in which the temple portions 5L and 5R are bent at the shaft support portions 443L and 443R so that the extending direction from the shaft support portions 443L and 443R is in the +X direction and the −X direction.

The respective directions in the following description on the temple portions 5L and 5R are the directions when the temple portions 5L and 5R are in the unfolded state.

Configuration of Left-side Temple Portion

Figure 9:
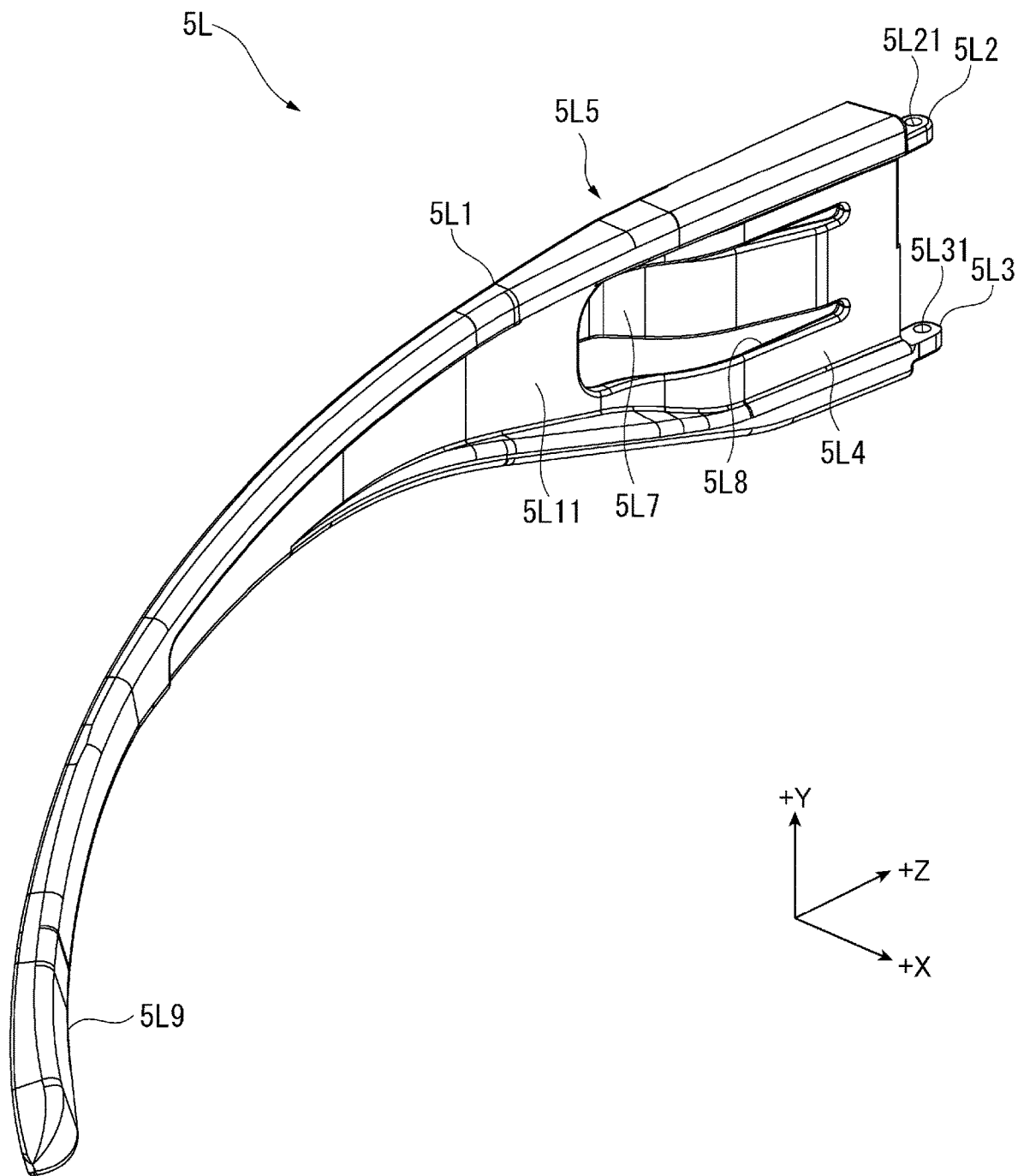
FIG. 9 is a perspective view for illustrating a left-side temple portion in the first exemplary embodiment.
Figure 10:
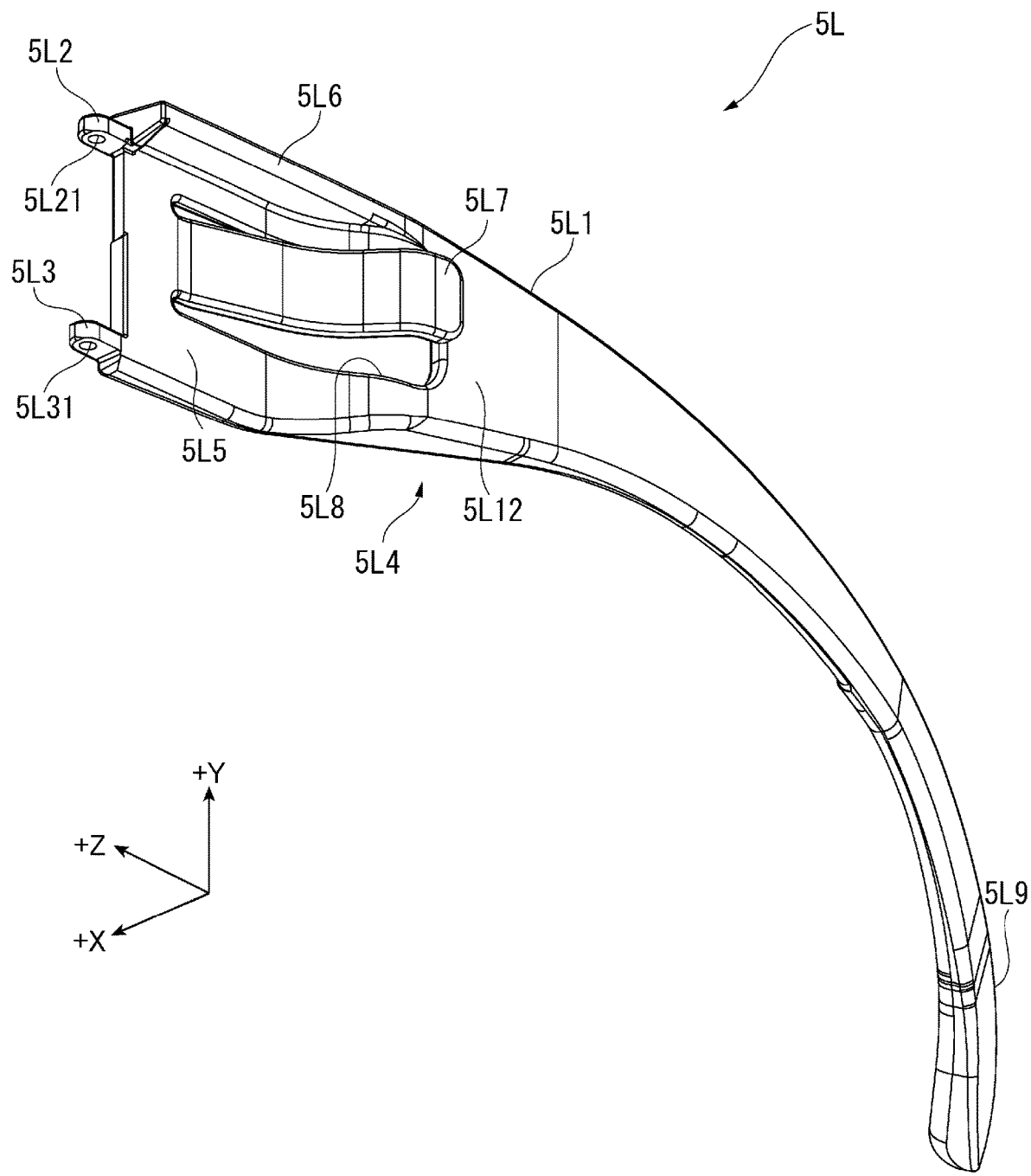
FIG. 10 is a perspective view for illustrating the left-side temple portion in the first exemplary embodiment.

FIG. 9 is a perspective view for illustrating the temple portion 5L in the unfolded state when viewed in the +X direction and the +Y direction, and FIG. 10 is a perspective view for illustrating the temple portion 5L in the unfolded state when viewed in the −X direction and the −Y direction.

As illustrated in FIG. 3, the temple portion 5L is positioned in the +X direction with respect to the left-side emitting unit 31L provided in the left-side casing 43L. In other words, the temple portion 5L is positioned on the center side of the head-mounted display apparatus 1A in the +X direction with respect to the left-side emitting unit 31L.

As illustrated in FIG. 9 and FIG. 10, the temple portion 5L includes an extending portion 5L1 and a drop end 5L9, and is formed into a shape in conformity with the left-side of the head of the user.

The extending portion 5L1 is a portion of the temple portion 5L from a support position of the shaft support portion 443L to a position corresponding to the left ear of the user. The extending portion 5L1 is curved in the −X direction as heading from the +Z direction end in the −Z direction, and is formed in an arc shape curved in the +X direction as heading in the −Z direction.

The extending portion 5L1 includes a first coupling portion 5L2, a second coupling portion 5L3, an arranging portion 5L4, a recessed portion 5L5, a protruding portion 5L6, a projecting portion 5L7, and an opening 5L8.

The first coupling portion 5L2 and the second coupling portion 5L3 are provided to project in the +Z direction from the +Z direction end of the extending portion 5L1, and are support positions of the shaft support portion 443L. The first coupling portion 5L2 is positioned in the +Y direction, and the second coupling portion 5L3 is positioned in the −Y direction.

The first coupling portion 5L2 is arranged between the first attaching portion 444L and the upper arm portion 4151 of the fixing portion 415L. In other words, the first coupling portion 5L2 is arranged in the +Y direction with respect to the first attaching portion 444L. The first coupling portion 5L2 includes a through-hole 5L21 into which the screw SL (see FIG. 4) inserted into the upper arm portion 4151 is inserted, and the screw SL inserted through the through-hole 5L21 is screwed to the screw hole 445L.

The second coupling portion 5L3 is arranged between the second attaching portion 446L and the lower arm portion 4153 of the fixing portion 415L. In other words, the second coupling portion 5L3 is arranged in the −Y direction with respect to the second attaching portion 446L. The second coupling portion 5L3 includes a through-hole 5L31 into which the screw (not shown) inserted into the lower arm portion 4153 is inserted, and the screw inserted through the through-hole 5L31 is screwed to the screw hole 447L.

With this, the temple portion 5L is rotatably supported by the shaft support portion 443L.

As illustrated in FIG. 9, the arranging portion 5L4 is positioned on a +X direction side surface 5L11 of the extending portion 5L1, and includes a recessed shape recessed in the −X direction. The arranging portion 5L4 is a portion at which a temple of glasses is arranged when the user wearing the glasses wears the head-mounted display apparatus 1A.

As illustrated in FIG. 10, the recessed portion 5L5 corresponds to a second recessed portion, and is a portion formed by the protruding portion 5L6 projecting in the −X direction from the +Y direction end of the −X direction side surface 5L12 in the extending portion 5L1. More specifically, the recessed portion 5L5 is positioned in the −Y direction with respect to the protruding portion 5L6, and includes a recessed shape recessed in the +X direction. The recessed portion 5L5 is a portion in which a part of the left-side casing 43L is arranged when the temple portion 5L is in the unfolded state. In other words, the recessed portion 5L5 is a portion in which the protruding portion 5L6 covers the step portion 448 of the left-side casing 43L (see FIG. 6) in the +Y direction, and is a portion into which a +X direction portion of the left-side casing 43L is fitted.

The projecting portion 5L7 is positioned in a +Z direction portion of the extending portion 5L1, and is a portion abutting the +X direction side surface 43LX of the left-side casing 43L. The projecting portion 5L7 projects toward the side surface 43LX, and abuts the side surface 43LX.

The opening 5L8 is an opening surrounding the projecting portion 5L7 in the three directions including the ±Y directions and the −Z direction, and passing through the temple portion 5L in the +X direction. In other words, the projecting portion 5L7 is coupled to the extending portion 5L1 at a +Z direction portion of the protruding portion 5L7.

The opening 5L8 described above is formed in the periphery of the projecting portion 5L7. With this, the projecting portion 5L7 has elasticity so as to be displaceable in the −X direction. Note that the advantageous effects of the projecting portion 5L7 are described in detail later.

The drop end 5L9 is a portion arranged along the back portion of the left ear of the user, and prevents the head-mounted display apparatus 1A from being shifted from the head.

The drop end 5L9 is formed continuously to the extending portion 5L1 at the portion of the extending portion 5L1 on a side opposite to the shaft support portion 443L, that is, on a side opposite to the first coupling portion 5L2 and the second coupling portion 5L3. The drop end 5L9 extends to be curved in the +X direction and the −Y direction as heading in the −Z direction. In other words, the distal end of the drop end 5L9 is positioned in the −Y direction with respect to the +Y direction end edge of the extending portion 5L1.

Configuration of Right-Side Temple Portion

Figure 11:
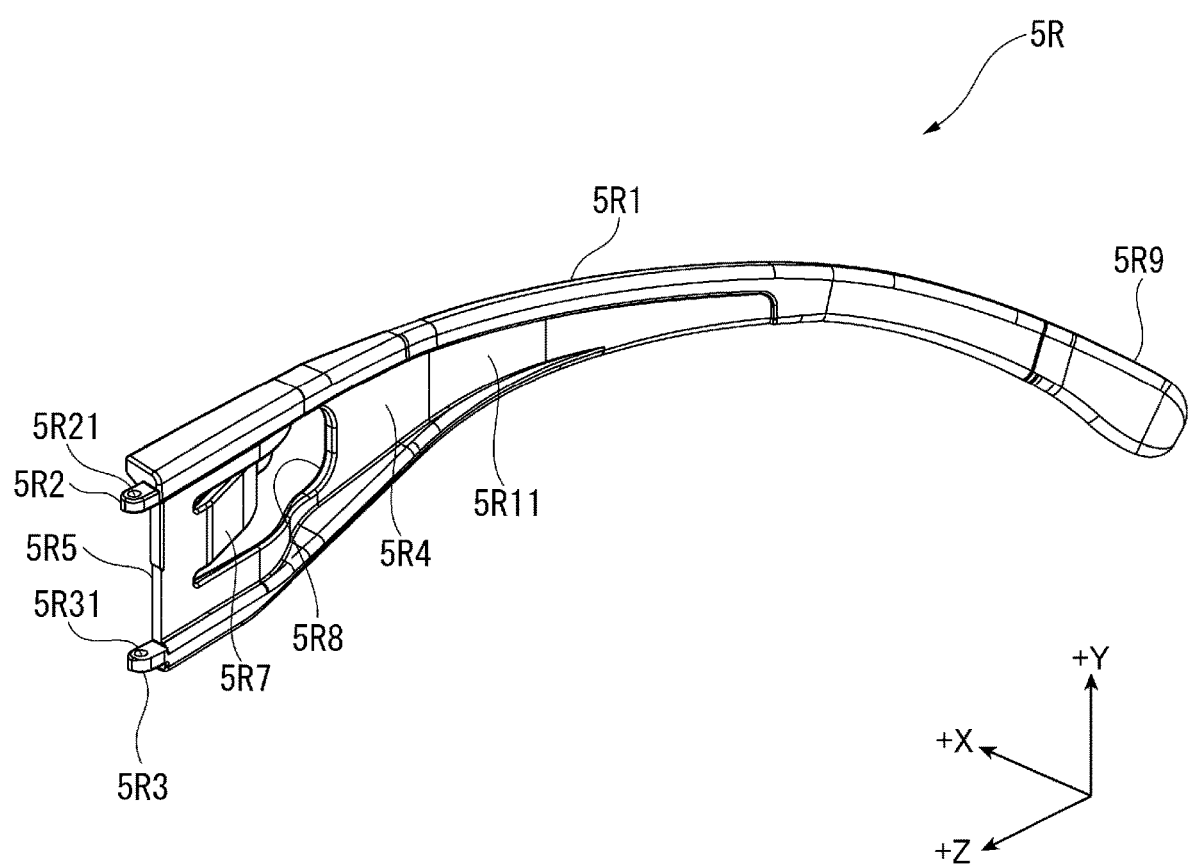
FIG. 11 is a perspective view for illustrating a right-side temple portion in the first exemplary embodiment.
Figure 12:
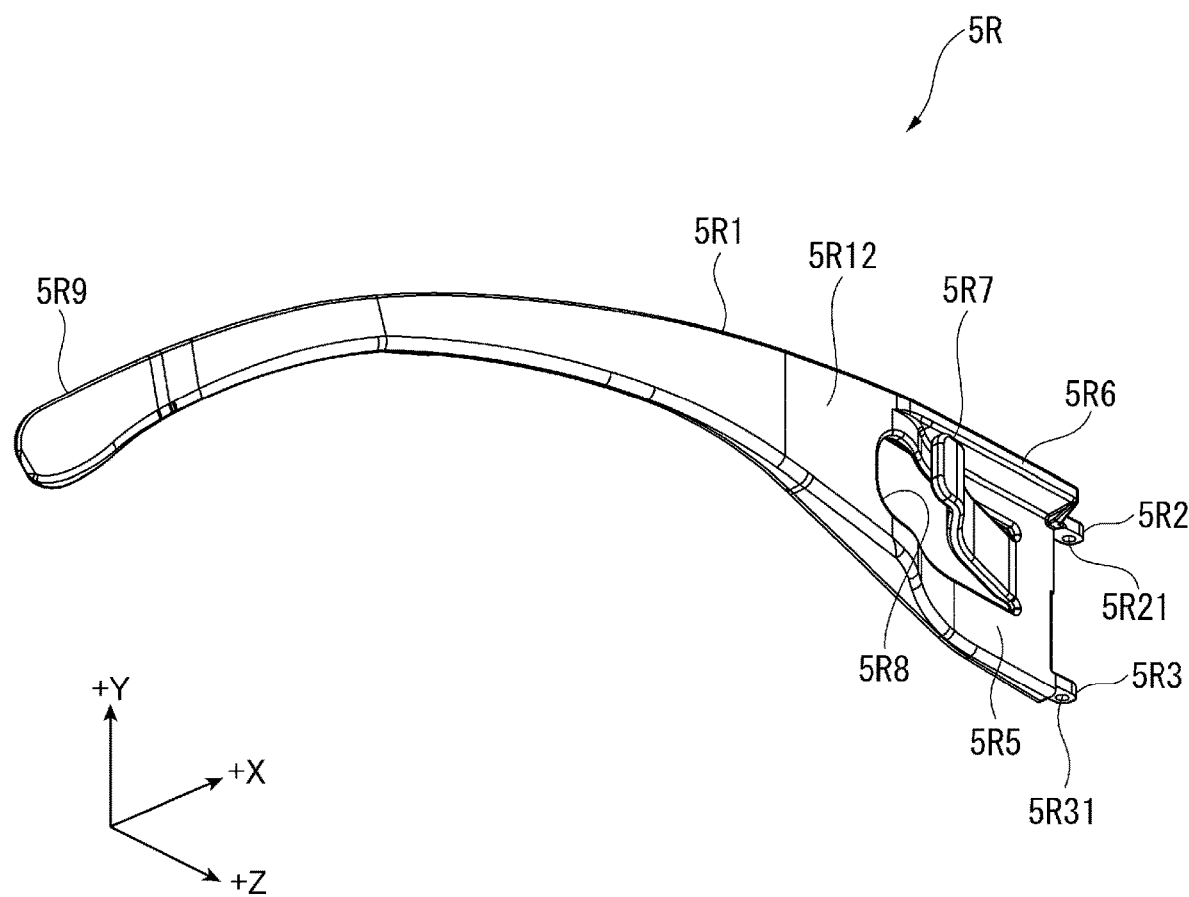
FIG. 12 is a perspective view for illustrating the right-side temple portion in the first exemplary embodiment.

FIG. 11 is a perspective view for illustrating the temple portion 5R in the unfolded state when viewed in the −X direction and the +Y direction, and FIG. 12 is a perspective view for illustrating the temple portion 5R in the unfolded state when viewed in the +X direction and the −Y direction.

As illustrated in FIG. 6 and FIG. 7, the temple portion 5R is positioned in the −X direction with respect to the right-side emitting unit 31R provided in the right-side casing 43R. In other words, the temple portion 5R is positioned on the center side of the head-mounted display apparatus 1A in the +X direction with respect to the right-side emitting unit 31R. The temple portion 5R is rotatable about the shaft support portion 443R in the ±DR1 directions in a rotation range between the unfolded state and the bent state.

The temple portion 5R has a mirror symmetric structure with respect to the temple portion 5L. Specifically, as illustrated in FIG. 11 and FIG. 12, the temple portion 5R includes an extending portion 5R1 including a −X direction side surface 5R11 and a +X direction side surface 5R12 and a drop end 5R9, and is formed into a shape in conformity with the right-side head of the user.

In other words, the extending portion 5R1 is a portion of the temple portion 5R from a support position of the shaft support portion 443R to a position corresponding to the right ear of the user. The extending portion 5R1 is curved in the +X direction as heading from the +Z direction end in the −Z direction, and is formed in an arc shape curved in the −X direction as heading in the −Z direction.

The extending portion 5R1 includes a first coupling portion 5R2, a second coupling portion 5R3, an arranging portion 5R4, a recessed portion 5R5, a protruding portion 5R6, a projecting portion 5R7, and an opening 5R8 similar to the first coupling portion 5L2, the second coupling portion 5L3, the arranging portion 5L4, the recessed portion 5L5 as the second recessed portion, the protruding portion 5L6, the projecting portion 5L7, and the opening 5L8. The first coupling portion 5R2 includes a through-hole 5R21, and the second coupling portion 5R3 includes a through-hole 5R31.

The drop end 5R9 is a portion arranged along the back portion of the right ear of the user, and prevents the head-mounted display apparatus 1A from being shifted from the head by gripping the head with the drop end 5R9. The drop end 5R9 extends to be curved in the −X direction and the −Y direction as heading in the −Z direction.

Action of Projecting Portion of Temple Portion

As described above, the projecting portion 5L7 has the opening 5L8 surrounding the projecting portion 5L7 in the three directions, and hence has elasticity so as to be displaceable in the +X direction. With this, when the extending portion 5L1 abuts the side surface 43LX, the extending portion 5L1 is to be rotated in a direction away from the side surface 43LX, that is, in the −DL1 direction, due to elasticity of the projecting portion 5L7.

Similarly, the projecting portion 5R7 includes the opening 5R8, and hence has elasticity so as to be displaceable in the −X direction. With this, when the extending portion 5R1 abuts the side surface 43RX, the extending portion 5R1 is to be rotated in a direction away from the side surface 43RX, that is, in the −DR1 direction, due to elasticity of the projecting portion 5R7.

With this, for example, when the user with a small head wears the head-mounted display apparatus 1A, the temple portions 5L and 5R press the head appropriately, and hence a sensation of wearing the head-mounted display apparatus 1A is improved.

Figure 13:
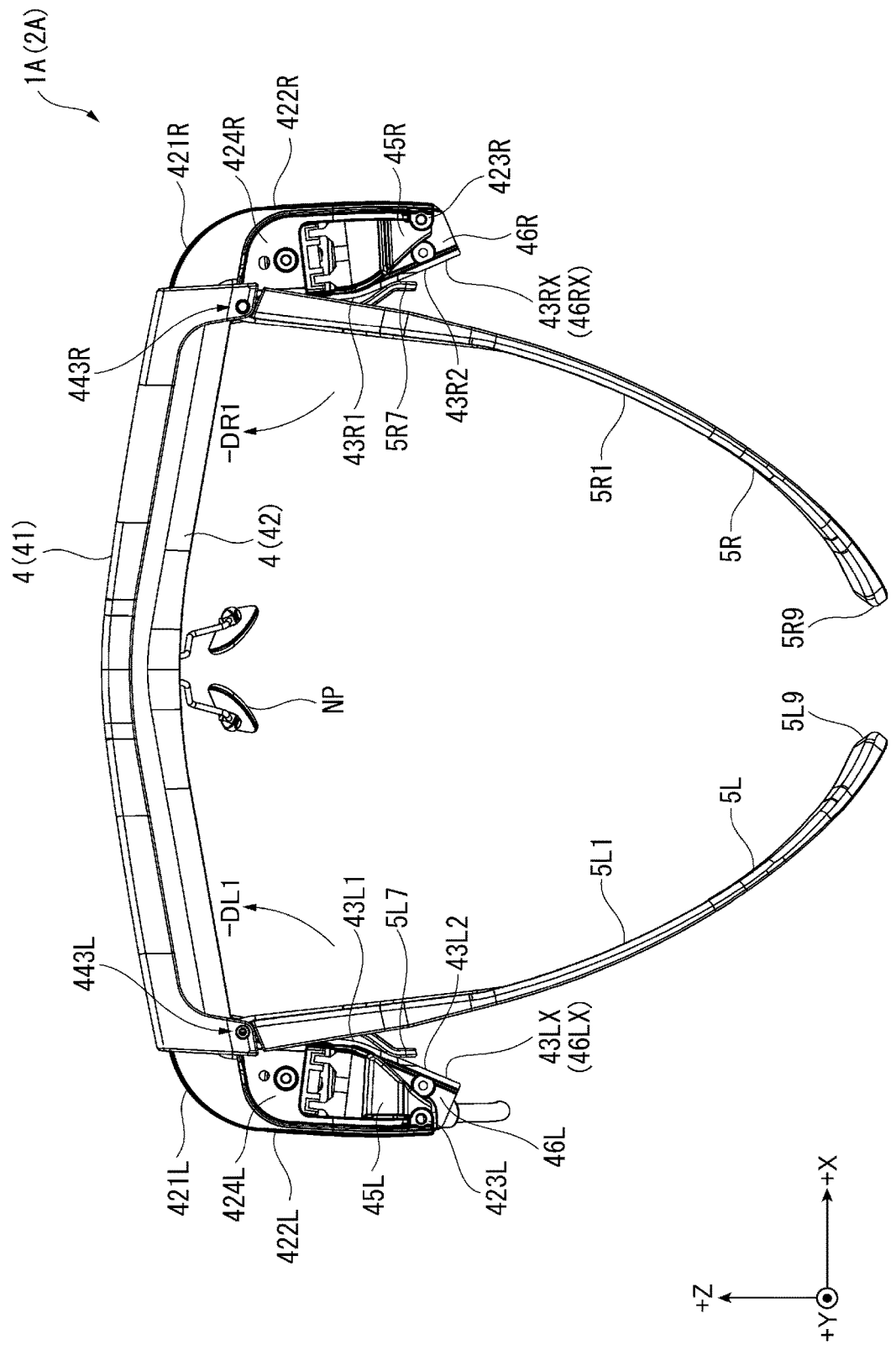
FIG. 13 is a plan view for illustrating the head-mounted display apparatus according to the first exemplary embodiment from which an upper casing is removed.

FIG. 13 is a plan view for illustrating the head-mounted display apparatus 1A from which the upper casings 44L and 44R are removed, when viewed in the +Y direction. In other words, FIG. 13 is a view for illustrating an abutting portion of the projecting portion 5L7 on the left-side casing 43L and an abutting portion of the projecting portion 5R7 on the right-side casing 43R.

Here, as illustrated in FIG. 13, the abutting portion of the projecting portion 5L7 with respect to the left-side casing 43L is a portion of the −Z direction side surface 43LX. More specifically, the abutting portion of the projecting portion 5L7 is the inclined surface 43L2 positioned in the −Z direction with respect to the portion of the side surface 43LX corresponding to the left-side emitting unit 31L. Similarly, the abutting portion of the projecting portion 5R7 on the right-side casing 43R is the inclined surface 43R2 positioned in the −Z direction with respect to the portion of the side surface 43RX corresponding to the right-side emitting unit 31R.

Thus, even when the projecting portions 5L7 and 5R7 apply a high pressing force on the side surfaces 43LX and 43RX by, for example arranging the temple portions 5L and 5R in the unfolded state, the side surfaces 43LX and 43RX are prevented from being warped, and the mirror barrel 35L arranged in the left-side casing 43L and the mirror barrel 35R arranged in the right-side casing 43R are prevented from being displaced.

Further, the mirror barrels 35L and 35R are fixed by the mirror-barrel fixing portions 424L and 424R of the frame 42 being a metal member. With this point, the mirror barrels 35L and 35R are also prevented from being displaced.

Figure 14:
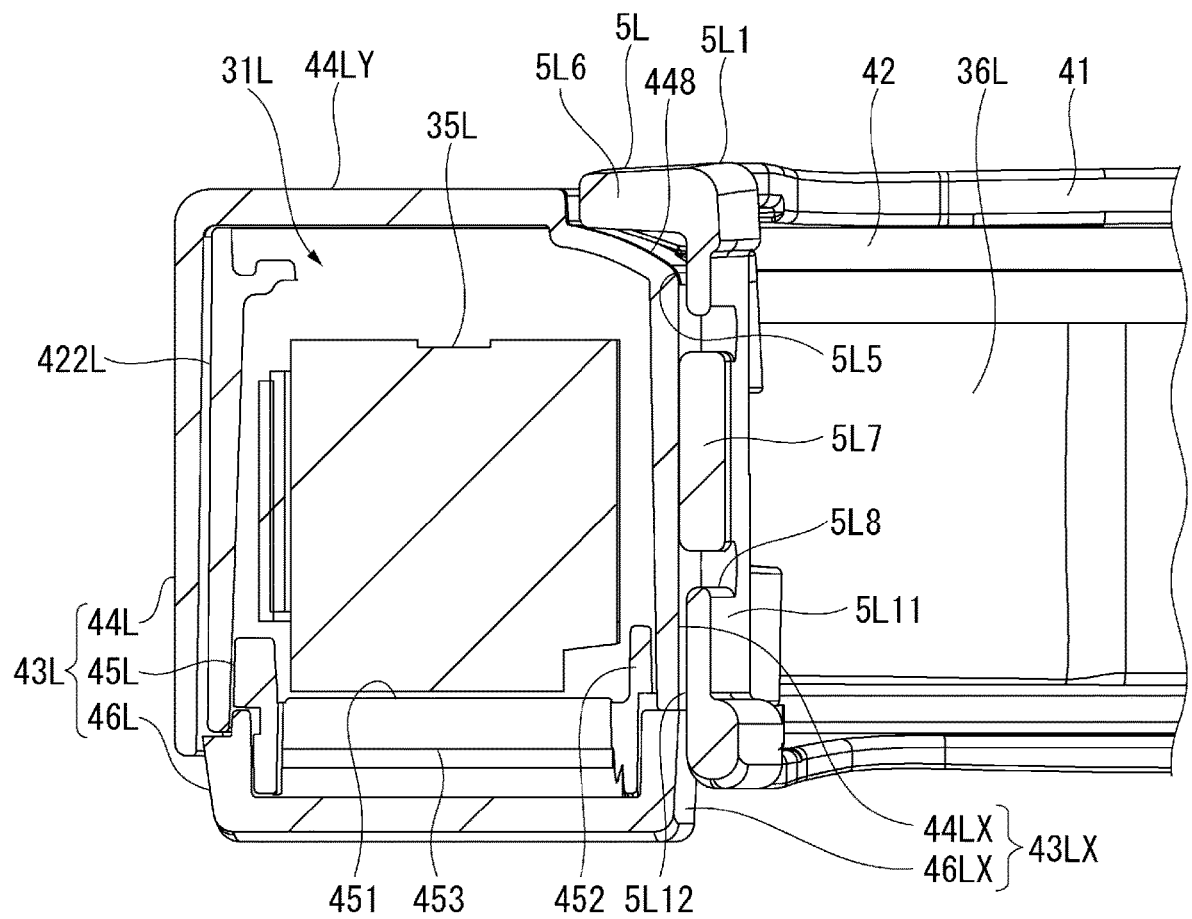
FIG. 14 is a cross-sectional view for illustrating the temple portion on the left side and a left-side casing in the first exemplary embodiment.
Figure 14:
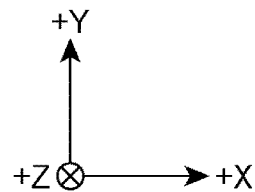

FIG. 14 is a view for illustrating a cross section taken along the plane YZ of the temple portion 5L and the left-side casing 43L. In other words, FIG. 14 is a view for partially illustrating a part of a cross section of the head-mounted display apparatus 1A taken along the line XIV-XIV in FIG. 3. Note that, in FIG. 14, the configurations of the left-side emitting unit 31L and the left-side casing 43L are partially omitted in the illustration.

As described above, the left-side casing 43L includes the inner casing 45L in the upper casing 44L and the lower casing 46L combined with each other. As illustrated in FIG. 14, the raised portion 452 of the inner casing 45L is positioned in the +X direction between the mirror barrel 35L and the side surface 43LX.

Thus, when the side surface 43LX is to be deformed due to a pressing force of the projecting portion 5L7, the raised portion 452 prevents the side surface 43LX from being deformed, and further, prevents the mirror barrel 35L from being deformed.

Note that the inner casing 45R of the right-side casing 43R is similarly configured.

Figure 15:
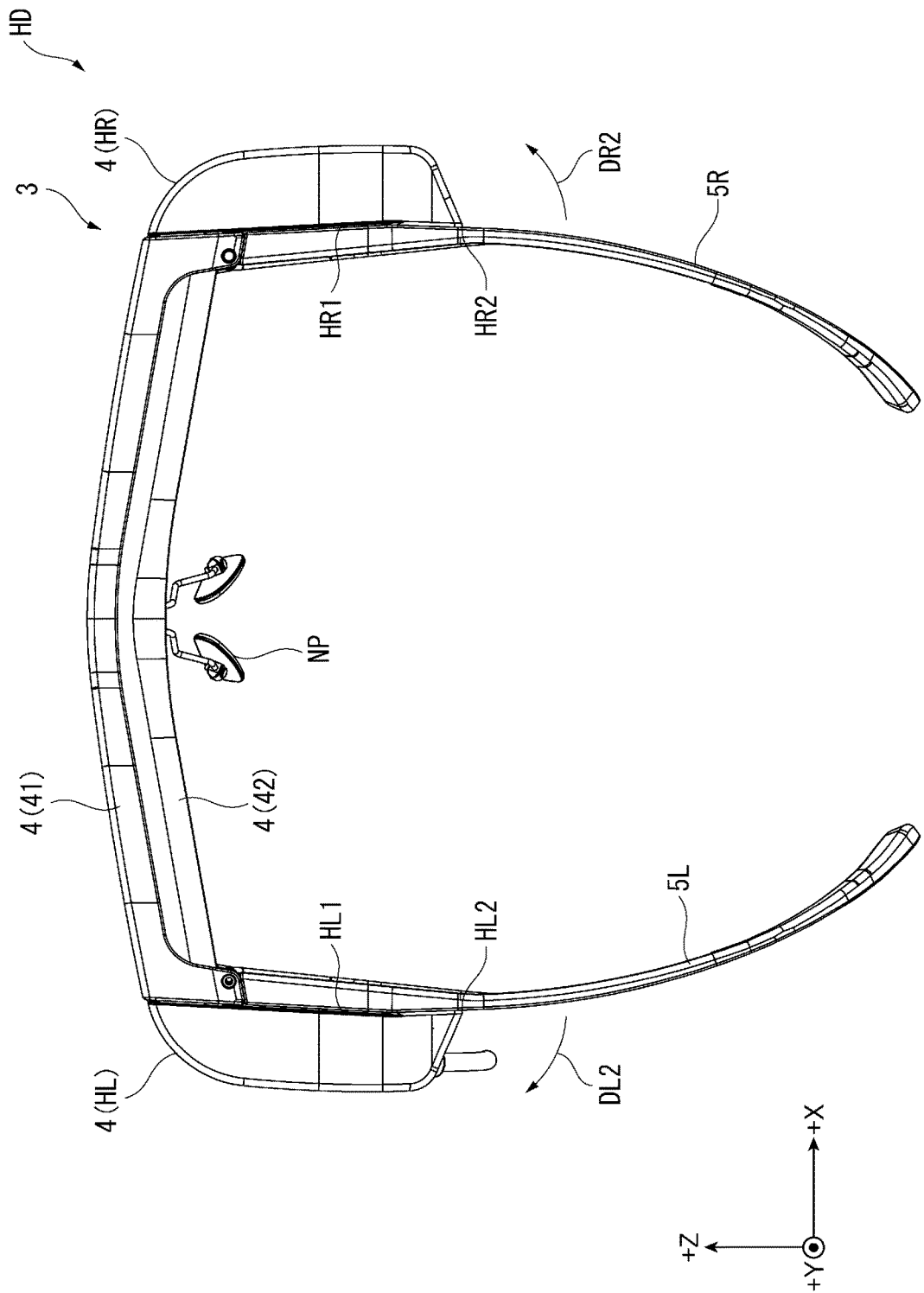
FIG. 15 is a plan view for illustrating a head-mounted display apparatus of a comparative example of the first exemplary embodiment.

Action of Gap Between Left-Side Casing and Left-Side Temple Portion and Gap Between Right-Side Casing and Right-Side Temple Portion FIG. 15 is a plan view for illustrating a head-mounted display apparatus HD being a comparative example of the head-mounted display apparatus 1A when viewed in the +Y direction.

Here, a description is given of action of the gap GL2 between the left-side casing 43L and the temple portion 5L in the unfolded state and the gap GR2 between the right-side casing 43R and the temple portion 5R in the unfolded state in the head-mounted display apparatus 1A by making comparison with the head-mounted display apparatus HD without the gaps GL2 and GR2.

As illustrated in FIG. 15, the head-mounted display apparatus HD has a similar configuration to that of the head-mounted display apparatus 1A except for including a left-side casing HL and a right-side casing HR in place of the left-side casing 43L and the right-side casing 43R. Specifically, the head-mounted display apparatus HD includes the left-side casing HL housing the left-side emitting unit 31L, the temple portion 5L rotatably supported by the left-side casing HL, the right-side casing HR housing the right-side emitting unit 31R, and the temple portion 5R rotatably supported by the right-side casing HR.

The left-side casing HL has a similar configuration to the left-side casing 43L, but is different from the left-side casing 43L in outer shape. Specifically, the left-side casing HL is formed into such a shape that a +X direction side surface HL1 on the temple portion 5L side extends along the temple portion 5L in the unfolded state in a range from the shaft support portion 443L provided at the +Z direction end to the −Z direction end of the left-side casing HL. In other words, the left-side casing HL does not include the recessed portion 43L3.

The right-side casing HR has a similar configuration to the right-side casing 43R, but is different from the right-side casing 43R in outer shape. Specifically, the right-side casing HR is formed into such a shape that the −X direction side surface HR1 on the temple portion 5R side extends along the temple portion 5R in the unfolded state in a range from the shaft support portion 443R provided at the +Z direction end to the −Z direction end of the right-side casing HR. In other words, the right-side casing HR does not include the recessed portion 43R3.

In other words, the gap GL2 is not present in the +X direction with respect to the left-side casing HL in a space with the temple portion 5L, and the gap GR2 is not present in the −X direction with respect to the right-side casing HR in a space with the temple portion 5R.

Note that dimensions of the left-side casing HL and the right-side casing HR in the +Z direction are the same as those of the left-side casing 43L and the right-side casing 43R.

When the user stretches outward the temple portions 5L and 5R in the unfolded state to wear the above-described head-mounted display apparatus HD, the temple portion 5L is unfolded outward from a −Z direction portion with respect to a contact portion with the left-side casing HL, and the temple portion 5R is unfolded outward from a −Z direction portion with respect to a contact portion with the right-side casing HR.

In other words, when a force of unfolding the temple portion 5L outward, that is, in the DL2 direction, is applied, the temple portion 5L supported by the left-side casing HL is flexibly bent in the DL2 direction with a −Z direction end HL2 of the left-side casing HL as a fulcrum.

Similarly, when a force of stretching the temple portion 5R outward, that is, in the DR2 direction is applied, the temple portion 5R supported by the right-side casing HR is flexibly bent in the DR2 direction with an end HR2 of the right-side casing HR in the −Z direction as a fulcrum. In this case, two thirds of the entire temple portions 5L and 5R in the −Z direction are flexibly bent outward.

However, in this case, the +Z direction portions of the temple portions 5L and 5R are hard to bend, and hence a bending amount of the temple portions 5L and 5R is insufficient. As a result, there may be a case in which a sensation of wearing the head-mounted display apparatus HD with respect to the head of the user, particularly, the sensation of wearing the head-mounted display apparatus HD with respect to the user with a small head, is insufficient.

Figure 16:
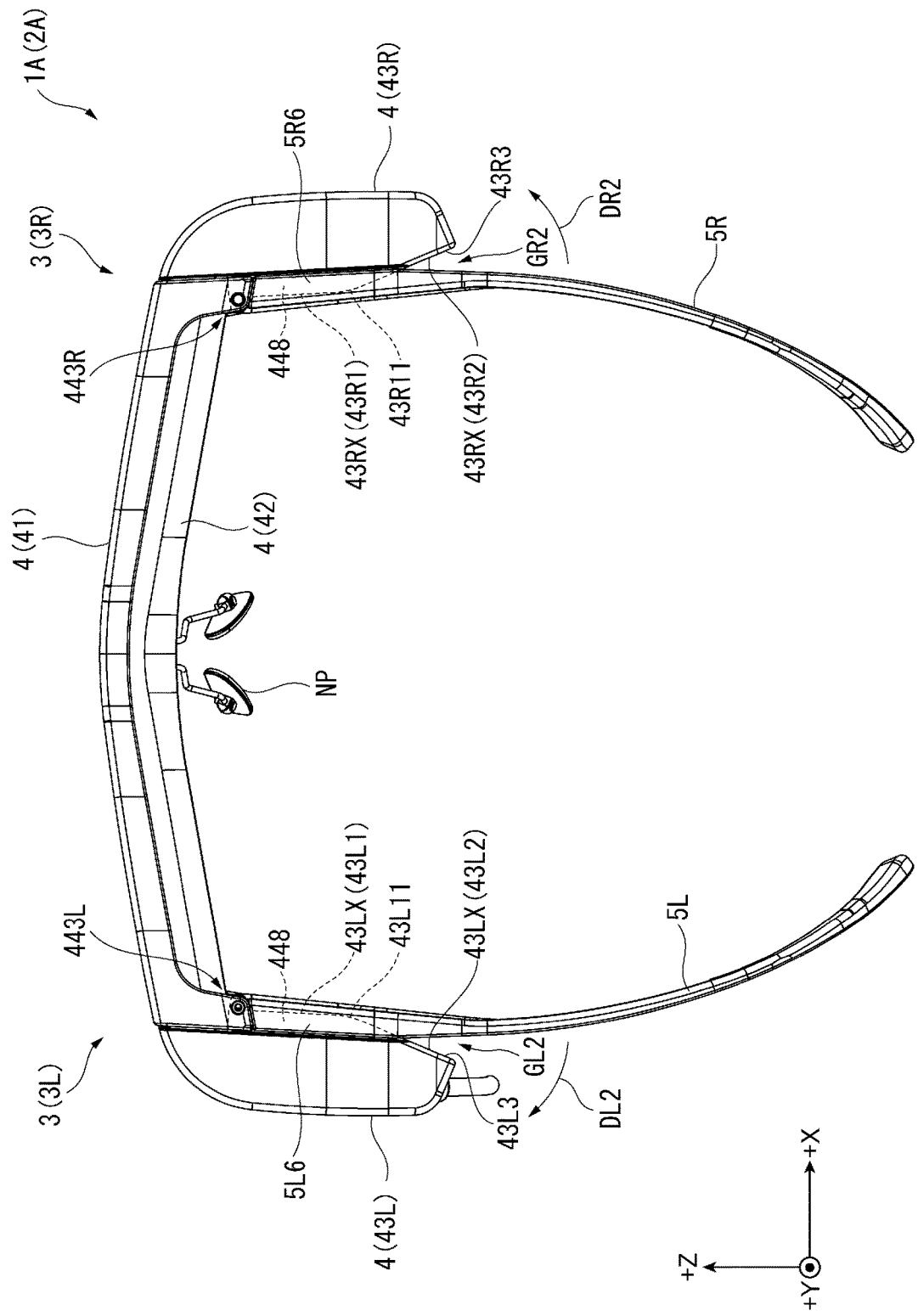
FIG. 16 is a plan view for illustrating the head-mounted display apparatus according to the first exemplary embodiment.

FIG. 16 is a plan view for illustrating the head-mounted display apparatus 1A when viewed in the +Y direction. In other words, FIG. 16 is a plan view for illustrating positions of fulcrums of the temple portions 5L and 5R of the head-mounted display apparatus 1A.

As compared with the left-side casing HL of the head-mounted display apparatus HD being the comparative example, as illustrated in FIG. 16, the left-side casing 43L of the head-mounted display apparatus 1A includes the recessed portion 43L3 at the portion in the −Z direction on the temple portion 5L side in the +X direction. Further, as compared to the right-side casing HR of the head-mounted display apparatus HD being the comparative example, the right-side casing 43R of the head-mounted display apparatus 1A includes the recessed portion 43R3 at the portion in the −Z direction on the temple portion 5R side in the −X direction. With this, the gap GL2 is formed between the left-side casing 43L and the temple portion 5L in the unfolded state, and the gap GR2 is formed between the right-side casing 43R and the temple portion 5R in the unfolded state.

Further, in the left-side casing 43L, the abutting surface 43L1 positioned the +Z direction on the side surface 43LX in the +X direction is in contact with the temple portion 5L. With this, when a force of unfolding the temple portion 5L outward in the DL2 direction is applied, the temple portion 5L is flexibly bent in the DL2 direction with the −Z direction end 43L11 of the abutting surface 43L1 as a fulcrum.

Similarly, in the right-side casing 43R, the abutting surface 43R1 positioned in the +Z direction on the −X direction side surface 43RX is in contact with the temple portion 5R. With this, when a force of stretching the temple portion 5R outward in the DR2 direction is applied, the temple portion 5R is flexibly bent in the DR2 direction with the −Z direction end 43R11 of the abutting surface 43R1 as a fulcrum.

As described above, in the head-mounted display apparatus 1A, the temple portions 5L and 5R are flexibly bent in the DL2 direction and the DR2 direction with the ends 43L11 and 43R11 as fulcrums, the ends 43L11 and 43R11 being positioned in the +Z direction with respect to the ends HL2 and HR2 of the head-mounted display apparatus HD as the comparative example.

With this as compared to the case of the head-mounted display apparatus HD, the temple portions 5L and 5R can be flexibly bent to a large degree, and hence a sensation of wearing the head-mounted display apparatus 1A for the head of the user, particularly, the sensation of wearing the head-mounted display apparatus 1A for the user with a small head can be improved.

Advantageous Effects of First Exemplary Embodiment

With the head-mounted display apparatus 1A according to the present exemplary embodiment described above, the following advantages can be achieved.

The head-mounted display apparatus 1A includes the frame 42 extending in the +X direction being the first direction, the display unit 3 configured to emit image light in the −Z direction being the second direction intersecting the first direction, the left-side casing 43L and the right-side casing 43R being casings attached to both of the +X direction ends of the frame 42 and housing the left-side emitting unit 31L and the right-side emitting unit 31R being parts of the display unit 3, and the temple portions 5L and 5R arranged on +X direction center sides of the left-side casing 4L and the right-side casing 4R. The left-side casing 43L includes the side surface 43LX positioned on the temple portion 5L side and the recessed portion 43L3 being the first recessed portion opened in the −Z direction in the side surface 43LX and forming the gap GL2 being the first gap with the temple portion 5L arranged along the side surface 43LX. The right-side casing 43R is similarly configured.

According to the configuration described above, as compared to the head-mounted display apparatus HD in the comparative example described above, the fulcrums of the bending of the temple portions 5L and 5R can be positioned in the +Z direction. As a result, the temple portions 5L and 5R are easy to be flexibly bent, and a bending amount of the temple portions 5L and 5R can be increased. Therefore, a sensation of wearing the head-mounted display apparatus 1A for the head of the user can be improved.

The temple portion 5L includes the recessed portion 5L5 being the second recessed portion into which a part of the left-side casing 43L is fitted, in the unfolded state of being arranged along the side surface 43LX, on the temple portion 5L side, of the left-side casing 43L. Further, in the temple portion 5L in the unfolded state, the protruding portion 5L6 projecting toward the left-side casing 43L side at the temple portion 5L covers the step portion 448 positioned on the +Y direction surface of the left-side casing 43L, in the +Y direction. The temple portion 5R similarly includes the recessed portion 5R5 and the protruding portion 5R6.

According to the configuration described above, a part of the left-side casing 43L is covered by the temple portion 5L in the unfolded state in the +Y direction. With this, the space for housing the left-side emitting unit 31L can be secured, and when the temple portion 5L is in the unfolded state, that is, when the head-mounted display apparatus 1A is mounted on the head, the left-side casing 43L can appear small. Similar effects can be achieved by the right-side casing 43R and the temple portion 5R. Therefore, the appearance of the head-mounted display apparatus 1A can be satisfactory.

The temple portion 5L includes the projecting portion 5L7 abutting the side surface 43LX in the unfolded state where the temple portion 5L is arranged along the side surface 43LX, and the projecting portion 5L7 has elasticity.

According to the configuration described above, the projecting portion 5L7 abuts the side surface 43LX, and hence the temple portion 5L is rotated to the +X direction center side of the head-mounted display apparatus 1A. With this, for example, when the user with a small head wears the head-mounted display apparatus 1A, an appropriate pressure can be applied to the head of the user. Therefore, a sensation of wearing the head-mounted display apparatus 1A can be improved.

Further, the projecting portion 5L7 has elasticity, and hence the temple portion 5L can extend along the side surface 43LX. Therefore, when the user with a large head wears the head-mounted display apparatus 1A, the space between the temple portions 5L and 5R can be widened, and the projecting portion 5L7 can be prevented from interfering.

Similar effects can be achieved by the temple portion 5R having a similar configuration to that of the temple portion 5L.

The temple portion 5L includes the opening 5L8 surrounding a ±Y direction and the −Z direction part of the projecting portion 5L7. Similarly, the temple portion 5R includes the opening 5R8 surrounding a ±Y direction and the −Z direction part of the projecting portion 5R7.

According to the configuration described above, the projecting portions 5L7 and 5R7 can be elastically deformed easily. In addition, it is not required to provide the projecting portions 5L7 and 5R7 as members independent from the temple portions 5L and 5R. As a result, a step of manufacturing the temple portions 5L and 5R can be simplified, and manufacturing cost can be reduced.

The left-side casing 43L includes the shaft support portion 443L as a temple support portion provided to the side surface 43LX and supporting the temple portion 5L. The temple portion 5L includes the first coupling portion 5L2 and the second coupling portion 5L3 sandwiching the shaft support portion 443L in the +Y direction being the third direction intersecting the first direction and the second direction and supported by the shaft support portion 443L. The shaft support portion 443L includes the first attaching portion 444L to which the first coupling portion 5L2 is attached and the second attaching portion 446L to which the second coupling portion 5L3 is attached. The gap GL1 as the second gap is formed between the first attaching portion 444L and the second attaching portion 446L in the +Y direction.

According to the configuration described above, when the user wearing glasses wears the head-mounted display apparatus 1A, the temple of the glasses can be arranged in the gap GL1. Therefore, the glasses, the temple portion 5L, and the left-side casing 43L are prevented from interfering, and the head-mounted display apparatus 1A can be mounted appropriately. Similar effects can be achieved by the temple portion 5R having a similar configuration to that of the temple portion 5L and the shaft support portion 443R as a temple support portion having a similar configuration to that of the shaft support portion 443L.

The display unit 3 includes the left-side emitting unit 31L as an image emitting unit arranged in the left-side casing 43L along the −Z direction being the second direction and configured to emit image light in the +Z direction, and the left-side light-guiding unit 36L as a light-guiding unit arranged in the +X direction and configured to guide the left-eye image light emitted from the left-side emitting unit 31L to the left eye of the user as the predetermined viewing position. Further, the display unit 3 includes the right-side emitting unit 31R and the right-side light-guiding unit 36R similar to the left-side emitting unit 31L and the left-side light-guiding unit 36L.

According to the configuration described above, the left-eye image light emitted from the left-side emitting unit 31L arranged in the left-side casing 43L can be guided to the left eye by the left-side light-guiding unit 36L, and the right-eye image light emitted from the right-side emitting unit 31R arranged in the right-side casing 43R can be guided to the right eye of the user by the right-side light-guiding unit 36R. Therefore, the image light can enter the eyes of the user, and the image formed by the image light can be displayed so as to be visually recognized by the user.

The left-side casing 43L includes the shaft support portion 443L as a temple support portion provided to the side surface 43LX and supporting the temple portion 5L. The shaft support portion 443L is arranged on the side surface 43LX in the +Z direction opposite to the second direction with respect to the ±Z direction center. Similarly, the shaft support portion 443R as a temple support portion supporting the temple portion 5R is arranged on the side surface 43RX in the +Z direction opposite to the second direction with respect to the ±Z direction center.

According to the configuration described above, the shaft support portions 443L and 443R can be positioned in the +Z direction, and hence the temple portions 5L and 5R supported by the shaft support portions 443L and 443R can be unfolded to extend in the +Z direction. Therefore, the temple portions 5L and 5R can easily fit with the head, and a sensation of wearing the head-mounted display apparatus 1A can be improved.

Here, the vicinity of the crossing portion of the left-side emitting unit 31L and the left-side light-guiding unit 36L and the vicinity of the crossing portion of the right-side emitting unit 31R and the right-side light-guiding unit 36R are liable to be dead spaces.

With respect to this point, the shaft support portion 443L can be arranged in the vicinity of the crossing portion of the left-side emitting unit 31L as an image emitting unit and the left-side light-guiding unit 36L as a light-guiding unit. Further, the shaft support portion 443R can be arranged in the vicinity of the crossing portion of the right-side emitting unit 31R as an image emitting unit and the right-side light-guiding unit 36R as a light-guiding unit. With this, the dead spaces can be utilized effectively, and the head-mounted display apparatus 1A can be reduced in size. In addition, the shaft support portions 443L and 443R can be arranged at the positions less liable to enter the visual field of the user.

The frame 42 is a metal member formed of metal. In the left-side emitting unit 31L as an image emitting unit, the mirror barrel 35L in which the image forming unit 33L and the image projection unit 34L are integrated is fixed to the mirror-barrel fixing portion 424L of the frame 42. Further, in the right-side emitting unit 31R being an image emitting unit, the mirror barrel 35R in which the image forming unit 33R and the image projection unit 34R are integrated is fixed to the mirror-barrel fixing portion 424R of the frame 42.

According to the configuration described above, the mirror barrel 35L of the left-side emitting unit 31L is fixed to the metal frame, and hence the mirror barrel 35L can be prevented from being displaced. Therefore, the left-eye image light emitted from the left-side emitting unit 31L can be guided stably to the left eye of the user. Similar effects can be achieved by fixing the mirror barrel 35R of the right-side emitting unit 31R configured to emit the right-eye image light, to the mirror-barrel fixing portion 424R of the frame 42.

The left-side casing 43L includes the inner casing 45L provided in the space generated by combining the upper casing 44L and the lower casing 46L of the left-side casing 43L. The inner casing 45L includes the raised portion 452 positioned between the mirror barrel 35L of the left-side emitting unit 31L and the side surface 43LX. The inner casing 45R also includes the raised portion 452 positioned between the mirror barrel 35R of the right-side emitting unit 31R and the side surface 43RX.

According to the configuration described above, even when a pressing force is applied to the side surface 43LX by the projecting portion 5L7 or the like, the side surface 43LX can be prevented from being deformed, and hence the mirror barrel 35L positioned in the left-side casing 43L can be prevented from being deformed. Therefore, the left-eye image light can be emitted appropriately to the left-side light-guiding unit 36L. Similar effects can be achieved by the raised portion 452 of the inner casing 45R forming the right-side casing 43R.

Second Exemplary Embodiment

Next, a second exemplary embodiment of the present disclosure is described.

A head-mounted display apparatus according to the present exemplary embodiment has a similar configuration to that of the head-mounted display apparatus 1A described in the first exemplary embodiment, but is different from the head-mounted display apparatus 1A in a shape of recessed portions positioned at −Z direction portions in a left-side casing and a right-side casing. Note that, in the following description, the portions similar to or substantially the same as the portions described above are denoted by the same reference signs, and description therefor is omitted.

Figure 17:
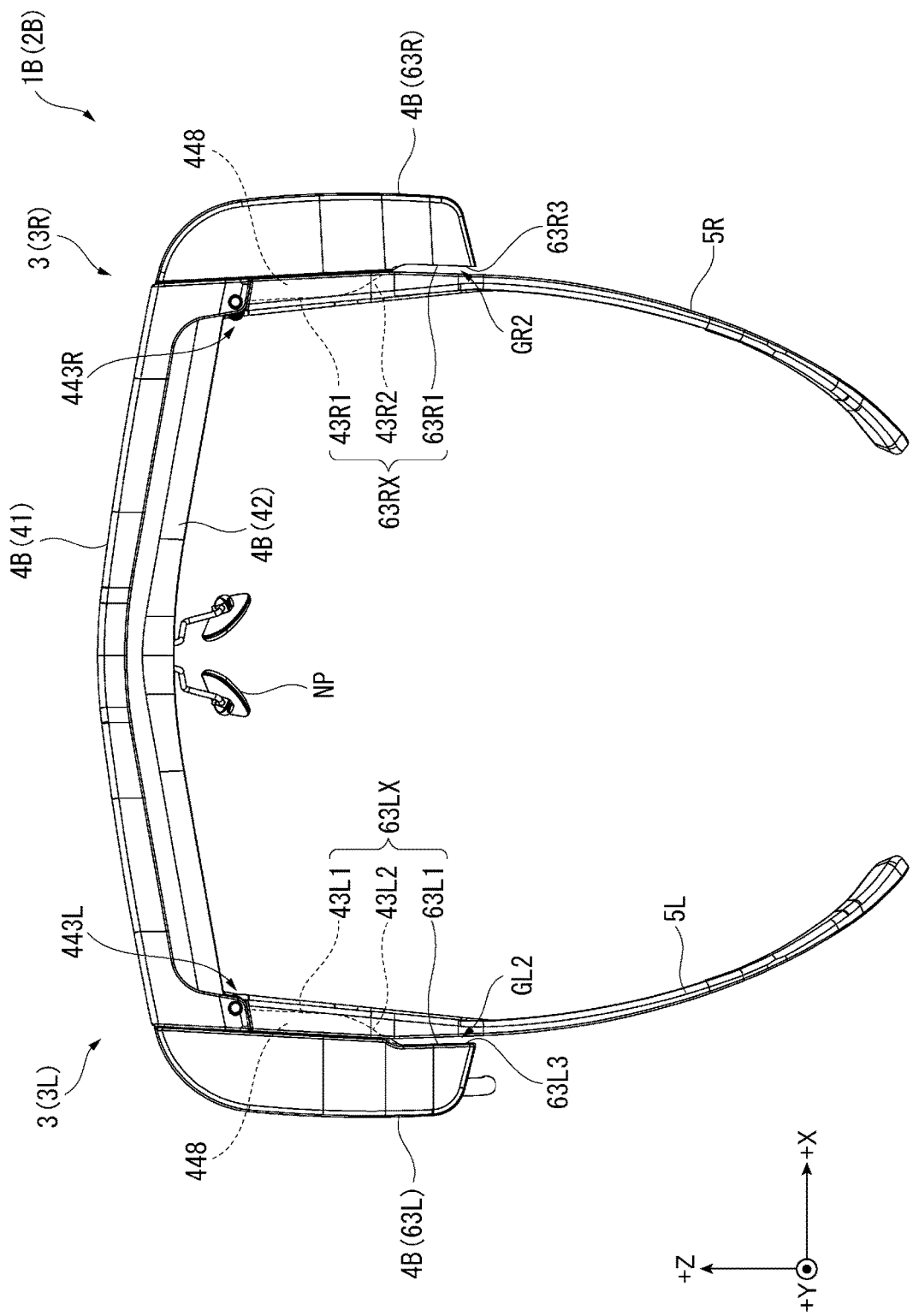
FIG. 17 is a plan view for illustrating a head-mounted display apparatus according to a second exemplary embodiment of the present disclosure.

FIG. 17 is a plan view for illustrating a head-mounted display apparatus 1B according to the present exemplary embodiment when viewed in the +Y direction.

As illustrated in FIG. 17, the head-mounted display apparatus 1B according to the present exemplary embodiment has a similar configuration and function to those of the head-mounted display apparatus 1A except for including a left-side casing 63L and a right-side casing 63R in place of the left-side casing 43L and the right-side casing 43R. Specifically, the head-mounted display apparatus 1B includes a device main body 2B including the display unit 3, a support section 4B, the temple portions 5L and 5R, and the nose pad NP.

The support section 4B includes the mounting member 41, the frame 42, the left-side casing 63L provided to the −X direction end of the frame 42, and the right-side casing 63R provided to the +X direction end of the frame 42, and functions similar to the support section 4.

Further, the left-side casing 63L and the right-side casing 63R have a similar configuration and function to those of the right-side casing 43R and the left-side casing 43L except for having a different outer shape.

Specifically, the left-side casing 63L has a similar configuration and function to those of the left-side casing 43L except for including a recessed portion 63L3 being a first recessed portion in place of the recessed portion 43L3. Further, the right-side casing 63R has a similar configuration and function to those of the right-side casing 43R except for including a recessed portion 63R3 as a first recessed portion in place of the recessed portion 43R3.

More specifically, in the left-side casing 63L, a side surface 63LX oriented toward the +X direction center of the head-mounted display apparatus 1B, that is, the +X direction side surface 63LX, includes the abutting surface 43L1 positioned in the +Z direction, the inclined surface 43L2 positioned in the −Z direction with respect to the abutting surface 43L1, and a flat surface 63L1 positioned in the −Z direction with respect to the inclined surface 43L2 and being substantially parallel to the abutting surface 43L1. Of those, the flat surface 63L1 is away from the temple portion 5L in the unfolded state in the −X direction. By providing the inclined surface 43L2 and the flat surface 63L1 described above, the recessed portion 63L3 opened in the −Z direction and forming the gap GL2 between the left-side casing 63L and the temple portion 5L in the unfolded state, is provided in the left-side casing 63L. In other words, the left-side casing 63L includes the recessed portion 63L3 forming the gap GL2 with the temple portion 5L in the unfolded state.

Note that, in the present exemplary embodiment, the projecting portion 5L7 of the temple portion 5L abuts the inclined surface 43L2, but may abut the flat surface 63L1.

Similarly, in the right-side casing 63R, a side surface 63RX oriented toward the +X direction center of the head-mounted display apparatus 1B, that is, the −X direction side surface 63RX, includes the abutting surface 43R1 positioned in the +Z direction, the inclined surface 43R2 positioned in the −Z direction with respect to the abutting surface 43R1, and a flat surface 63R1 positioned in the −Z direction with respect to the inclined surface 43R2 and being substantially parallel to the abutting surface 43R1. Of those, the flat surface 63R1 is away from the temple portion 5R in the unfolded state in the +X direction. By providing the inclined surface 43R2 and the flat surface 63R1 described above, the recessed portion 63R3 opened in the −Z direction and forming the gap GR2 between the right-side casing 63R and the temple portion 5R in the unfolded state, is provided in the right-side casing 63R. In other words, the right-side casing 63R includes the recessed portion 63R3 forming the gap GR2 with the temple portion 5R in the unfolded state.

Note that, in the present exemplary embodiment, the projecting portion 5R7 of the temple portion 5R abuts the inclined surface 43R2, but may abut the flat surface 63R1.

Also with the head-mounted display apparatus 1B according to the present exemplary embodiment described above, similar effects to those of the head-mounted display apparatus 1A according to the first exemplary embodiment can be achieved.

Note that, on the side surface 63LX, the connecting surface connecting the abutting surface 43L1 and the flat surface 63L1 with each other may not be the inclined surface 43L2, and may be, for example, a surface parallel to the XY plane. Similarly, on the side surface 63RX, the connecting surface connecting the abutting surface 43R1 and the flat surface 63R1 with each other may not be the inclined surface 43R2, and may be, for example, a surface parallel to the XY plane. In this case, the projecting portions 5L7 and 5R7 of the temple portions 5L and 5R may abut the above-mentioned connecting surfaces, and may abut the flat surfaces 63L1 and 63R1.

Modified Embodiment of Exemplary Embodiment

The present disclosure is not limited to the exemplary embodiments described above, and the present disclosure includes variations, improvements, and the like within the scope in which the object of the present disclosure can be accomplished.

In the exemplary embodiments described above, the recessed portions 43L3, 43R3, 63L3, and 63R3 being first recessed portions are opened in the −Z direction, and also opened in the ±Y directions. However, the first recessed portion is not limited thereto. The first recessed portion is not required to be opened in at least one of the +Y direction and the −Y direction as long as the first recessed portion is positioned in a direction away from the temple portion and opened in the −Z direction to form the first gap together with the temple portion in the unfolded state.

In the exemplary embodiments described above, the temple portions 5L and 5R include the recessed portions 5L5 and 5R5 into which the +X direction portions of the left-side casings 43L and 63L and the −X direction portions of the right-side casings 43R and 63R are fitted when the temple portions 5L and 5R are in the unfolded state. Further, the temple portions 5L and 5R include the protruding portions 5L6 and 5R6 overlapping with the step portions 448 of the left-side casings 43L and 63L and the right-side casings 43R and 63R in the +Y direction when the temple portions 5L and 5R are in the unfolded state. However, the temple portions are not limited thereto, and the recessed portions 5L5 and 5R5 and the protruding portions 5L6 and 5R6 may not be provided. Further, the temple portions may have the following configuration. Specifically, other protruding portions protruding in the same direction as the protruding portions 5L6 and 5R6 are provided at the −Y direction portions of the temple portions, and the +X direction portions of the left-side casings 43L and 63L and the −X direction portions of the right-side casings 43R and 63R are fitted into the recessed portions formed between the protruding portions 5L6 and 5R6 and the other protruding portions.

In the exemplary embodiments described above, the temple portions 5L and 5R include the projecting portions 5L7 and 5R7 having elasticity. However, the temple portions are not limited thereto, and the projecting portions 5L7 and 5R7 may not be provided. Further, in place of the projecting portions 5L7 and 5R7, projecting portions having a similar function to that of the projecting portions 5L7 and 5R7 may be provided by providing temple portions with elastic members such as rubber or cushion.

In the exemplary embodiments described above, the shaft support portion 443L supporting the first coupling portion 5L2 and the second coupling portion 5L3 of the temple portion 5L includes the first attaching portion 444L and the second attaching portion 446L, and the first gap GL1 as the second gap is formed in the +Y direction between the first attaching portion 444L and the second attaching portion 446L. Further, the shaft support portion 443R supporting the first coupling portion 5R2 and the second coupling portion 5R3 of the temple portion 5R includes the first attaching portion 444R and the second attaching portion 446R, and the gap GR1 as the second gap is formed in the +Y direction between the first attaching portion 444R and the second attaching portion 446R. However, the temple portions are not limited thereto, the gaps GL1 and GR1 as the second gaps may not be formed. In other words, when the temple portions can be rotatably supported about the rotary shafts along the +Y direction, the configuration of the rotary shafts can be changed as appropriate. For example, the first attaching portion 444L and the second attaching portion 446L may be integrated, and the first attaching portion 444R and the second attaching portion 446R may be integrated. Further, for example, the first attaching portions 444L and 444R and the second attaching portions 446L and 446R may not have different shapes.

In the exemplary embodiments described above, the left-side emitting unit 31L as an image emitting unit arranged in the left-side casings 43L and 63L, includes the control unit 32L, the image forming unit 33L, and the image projection unit 34L. The image forming unit 33L is integrally provided with the mirror barrel 35L of the image projection unit 34L. However, the left-side emitting unit is not limited thereto, and the control unit 32L may not be provided in the left-side casings 43L and 63L. Further, the image forming unit 33L and the mirror barrel 35L may not be integrated. In other words, the left-side emitting portion may have any configuration as long as being capable of emitting the left-eye image light. The right-side emitting unit 31R as an image emitting unit includes the control unit 32R, the image forming unit 33R, and the image projection unit 34R and is similarly configured.

In the exemplary embodiments described above, the shaft support portion 443L as a temple support portion is provided at the +Z direction end of the side surfaces 43LX and 63LX including the surface 44LX, the +Z direction being opposite to the second direction, and the shaft support portion 443R as a temple support portion is provided at the +Z direction end of the side surfaces 43RX and 63RX including the surface 44RX. In other words, on the side surfaces 43LX and 63LX, the shaft support portion 443L is arranged in the vicinity of the crossing portion of the mirror barrel 35L of the left-side emitting unit 31L arranged in the −Z direction being the second direction, and the left-side light-guiding unit 36L arranged in the +X direction being the first direction. Further, on the side surfaces 43RX and 63RX including the surface 44RX, the shaft support portion 443R is arranged in the vicinity of a crossing point of a mirror barrel 35R of the right-side emitting unit 31R arranged in the −Z direction being the second direction, and the right-side light-guiding unit 36R arranged in the +X direction being the first direction. The shaft support portion 443L described above is provided to project on the side surfaces 43LX and 63LX, and may be at any raised position from the side surfaces 43LX and 63LX as long as the temple portion 5L is axially supported at the position in the +Z direction with respect to the −Z direction center of the side surfaces 43LX and 63LX, the −Z direction being the second direction when viewed in the +X direction. The shaft support portion 443R is similarly configured.

Meanwhile, the arrangement positions of the shaft support portions 443L and 443R may be changed as appropriate as long as the −Z direction ends of the side surfaces 43LX and 43RX are avoided.

In the exemplary embodiments described above, the shaft support portion 443L as a temple support portion rotatably supports the temple portion 5L about the rotary shaft in the +Y direction, and the shaft support portion 443R as a temple support portion rotatably supports the temple portion 5R about the rotary shaft in the +Y direction. However, the temple support portions are not limited thereto. The temple support portions are only required to support the corresponding temple portions, and may not necessarily support the corresponding temple portions in a rotatable manner. Further, the rotary shaft of the temple portions rotatably supported by the temple support portions are not limited to the rotary shafts in the +Y direction, and may be rotary shafts along other directions, for example, rotary shafts in the +X direction.

In the exemplary embodiments described above, the shaft support portion 443L as a temple support portion is provided to the side surfaces 43LX and 63LX of the left-side casings 43L and 63L, and the shaft support portion 443R as a temple support portion is provided to the side surfaces 43RX and 63RX of the right-side casings 43R and 63R. However, the positions to which the temple support portions are provided are not limited to the side surfaces on the arrangement sides of the temple portions in the casing housing the part of the display unit.

Specifically, without being limited to the side surfaces 43LX and 63LX, the temple support portion supporting the temple portion 5L may be provided to other surfaces of the left-side casings 43L and 63L, for example, at least one surface of the +Y direction surface and the −Y direction surface as long as the temple support portion is capable of supporting the temple portion 5L at the position on the +X direction center side of the head-mounted display apparatus 1A and 1B with respect to the left-side casings 43L and 63L. Further, the temple support portion supporting the temple portion 5L may be provided to one of the members forming the support section 4 other than the left-side casings 43L and 63L, for example, to the frame 42. The temple support portion supporting the temple portion 5R is similarly configured.

In the exemplary embodiments described above, the frame 42 is a metal member, and the mirror barrel 35L of the left-side emitting unit 31L and the mirror barrel 35R of the right-side emitting unit 31R are fixed to the mirror-barrel fixing portions 424L and 424R of the frame 42. However, the configuration is not limited thereto, and the members fixing the mirror barrels 35L and 35R are not particularly limited as long as the mirror barrels 35L and 35R are arranged in the left-side casings 43L and 63L and the right-side casings 43R and 63R.

In the exemplary embodiments described above, between the mirror barrel 35L forming the left-side emitting unit 31L and the side surface 43LX, the raised portion 452 of the inner casing 45L is arranged. Further, between the mirror barrel 35R forming the right-side emitting unit 31R and the side surface 43RX, the raised portion 452 of the inner casing 45R is arranged. However, the configuration is not limited thereto, and the raised portion 452 and the inner casings 45L and 45R may not necessarily be provided.

In the exemplary embodiments described above, the display unit 3 includes the left-side emitting unit 31L and the right-side emitting unit 31R as image emitting units configured to generate and emit the left-eye image light and the right-eye image light, and the left-side light-guiding unit 36L and the right-side light-guiding unit 36R as light-guiding units configured to guide the left-eye image light and the right-eye image light to the left eye and the right eye of the user as the predetermined viewing positions. However, the configuration of the display unit is not limited thereto as long as an image can be displayed visually recognizable by the user. For example, the display unit may include an image display panel arranged in front of the eyes of the user, and may include an image projection unit configured to project an image to retinas of the user.

Further, the direction in which the light-guiding units guide the image light may not be the +X direction and the −X direction, may be the +Y direction or the −Y direction, may be obtained by combining the +X direction and the ±Y directions, and may be obtained by combining the −X direction and the ±Y directions.

For example, it is only required that the left-side light-guiding unit 36L cause the left-eye image light emitted from the left-side emitting unit 31L in the +Z direction, to advance in the +Y direction or the −Y direction and advance in the +X direction, to emit the left-eye image light to the left eye of the user being the predetermined viewing position. In other words, the light-guiding path of the left-eye image determined by the left-side light-guiding unit 36L, is not limited thereto.

Similarly, it is only required that the right-side light-guiding unit 36R cause the right-eye image light emitted from the right-side emitting unit 31R in the +Z direction, to advance in the +Y direction or the −Y direction and advance in the −X direction, to emit the right-eye image light to the right eye of the user being the predetermined viewing position. In other words, the light-guiding path of the right-eye image determined by the right-side light-guiding unit 36R, is not limited thereto.

In the exemplary embodiments described above, the temple portion 5L and the temple portion 5R are mirror symmetric. However, the temple portion 5L and the temple portion 5R are not limited thereto, and one temple portion may not necessarily be mirror symmetric to the other temple portion. In other words, of the pair of temple portions included in the head-mounted display apparatus, one temple portion may have a shape different from that of the other temple portion.

Similarly, the left-side casing 43L and the right-side casing 43R may not be mirror symmetric, and the left-side casing 63L and the right-side casing 63R may not necessarily be mirror symmetric. For example, only one of the left-side casing 43L and the right-side casing 43R may have a recessed portion forming the first gap with the temple portion in the unfolded state. The left-side casing 63L and the right-side casing 63R are similarly configured.

In the exemplary embodiments described above, the display unit 3 includes the left-side display unit 3L configured to cause the left-side display unit 3L to enter the left eye of the user to display the left-eye image, and the right-side display unit 3R configured to cause the right-eye image to enter the right eye of the user to display the right-eye image. However, the display unit is not limited thereto, and one of the left-side display unit 3L and the right-side display unit 3R may not necessarily be provided.

In the exemplary embodiments described above, the head-mounted display apparatuses 1A and 1B include the temple portions 5L and 5R as mounting members for mounting the head-mounted display apparatus 1A and 1B on the head of the user. However, in place of the temple portions, a band arranged in a periphery of the head of the user may be adopted as a mounting member. In this case, when a band having a substantially U-like shape when viewed in the +Y direction is adopted as a mounting member, the band is arranged so that one end of the band is supported by the shaft support portion 443L and that the other end is supported by the shaft support portion 443R. In this manner, similar effects to those achieved by the head-mounted display apparatus 1A and 1B described above can be achieved.

What is claimed is:

1. A head-mounted display apparatus comprising:
a frame extending in a first direction;
a display unit configured to emit image light in a second direction intersecting the first direction;
a casing attached to one end, in the first direction, of the frame and housing a part of the display unit; and a temple portion arranged on a center side of the head-mounted display device, in the first direction, with respect to the casing, the temple portion having an outside surface in the first direction, wherein
the casing includes:
   a side surface positioned on a side on which the temple portion is arranged; and
   a first recessed portion, in the side surface, opening in the second direction to form a first gap separating the outside surface of the temple portion and the side surface of the casing, the outside surface of the temple portion being arranged along the side surface,
wherein the first gap abuts first recessed portion in the first direction.

2. The head-mounted display apparatus according to claim 1, wherein
the temple portion, in a state of being arranged along the side surface, includes a second recessed portion into which a part of the casing is fitted.

3. The head-mounted display apparatus according to claim 1, further comprising:
a protruding portion protruding from the outside surface of the temple portion and abutting the side surface, the protruding potion being configured to rotate the temple portion and having elasticity.

4. The head-mounted display apparatus according to claim 3, wherein
the temple portion includes an opening surrounding a part of the protruding portion.

5. The head-mounted display apparatus according to claim 1, wherein
the casing includes a temple support portion provided to the side surface and configured to support the temple portion,
the temple portion includes a first coupling portion and a second coupling portion sandwiching the temple support portion in a third direction intersecting the first direction and the second direction and supported by the temple support portion,
the temple support portion includes:
   a first attaching portion to which the first coupling portion is attached; and
   a second attaching portion to which the second coupling portion is attached, and
a second gap is formed between the first attaching portion and the second attaching portion in the third direction.

6. The head-mounted display apparatus according to claim 1, wherein
the display unit includes:
   an image emitting unit arranged in the casing in the second direction and configured to emit the image light; and
   a light-guiding unit arranged in the first direction and configured to guide, to a predetermined viewing position, the image light emitted from the image emitting unit.

7. The head-mounted display apparatus according to claim 6, wherein
the casing includes a temple support portion provided to the side surface and configured to support the temple portion, and
the temple support portion is arranged in a direction being opposite to the second direction from a center, in the second direction, of the side surface.

8. The head-mounted display apparatus according to claim 6, wherein
the frame is formed of metal, and
the image emitting unit is fixed to the frame.

9. The head-mounted display apparatus according to claim 6, wherein
the casing includes an inner casing provided in the casing, and
the inner casing includes a raised portion positioned between the image emitting unit and the side surface.

10. A head-mounted display apparatus comprising:
a frame extending in a first direction;
a display unit configured to emit image light in a second direction intersecting the first direction;
a casing attached to one end, in the first direction, of the frame and housing a part of the display unit; and
a temple portion arranged on a center side of the head-mounted display device, in the first direction, with respect to the casing, the temple portion having an outside surface in the first direction, wherein
the casing includes:
   a side surface positioned on a side on which the temple portion is arranged, the side surface including:
      an abutting surface abutting the temple portion; and
      an inclined surface separating away from the temple portion in the second direction; and
   a first recessed portion, in the side surface, opening in the second direction to form a first gap separating the outside surface of the temple portion and the side surface of the casing, the outside surface of the temple portion being arranged along the side surface,
wherein the first gap abuts first recessed portion in the first direction.

* * * * *